US009769458B2

(12) United States Patent
Wippermann et al.

(10) Patent No.: US 9,769,458 B2
(45) Date of Patent: Sep. 19, 2017

(54) MULTI-APERTURE DEVICE AND METHOD FOR DETECTING AN OBJECT REGION

(71) Applicant: Fraunhofer-Gesellschaft zur Foerderung der angewandten Forschung e.V., Munich (DE)

(72) Inventors: Frank Wippermann, Meiningen (DE); Andreas Brueckner, Jena (DE); Andreas Braeuer, Schloeben (DE)

(73) Assignee: Fraunhofer-Gesellshaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/148,545

(22) Filed: May 6, 2016

(65) Prior Publication Data
US 2016/0255330 A1    Sep. 1, 2016

Related U.S. Application Data

(63) Continuation of application No. PCT/EP2014/073457, filed on Oct. 31, 2014.

(30) Foreign Application Priority Data

Nov. 8, 2013   (DE) .................. 10 2013 222 780

(51) Int. Cl.
*H04N 13/02* (2006.01)
*H04N 5/225* (2006.01)

(52) U.S. Cl.
CPC ....... *H04N 13/0217* (2013.01); *H04N 5/2258* (2013.01); *H04N 13/025* (2013.01); *H04N 13/0228* (2013.01); *H04N 13/0232* (2013.01)

(58) Field of Classification Search
None
See application file for complete search history.

(56) References Cited

U.S. PATENT DOCUMENTS 7,239,352 B2 *  7/2007  Oda ................... H04N 3/155
                                                250/208.1
2009/0122148 A1  5/2009  Fife et al.
(Continued)

FOREIGN PATENT DOCUMENTS

DE    102009049387 A1    4/2011
EP        2177869 A2     4/2010
(Continued)

OTHER PUBLICATIONS

Venkataraman, K. et al., "PiCam: An Ultra-Thin High Performance Monolithic Camera Array", ACM Transactions on Graphics (TOG). Proceedings of ACM SIGGRAPH Asia 2013, vol. 23, Issue 6, Article No. 166., http://www.pelicanimaging.com/technology/PiCam_sa13.pdf, Nov. 2013, pp. 1-13.

*Primary Examiner* — Mark T Monk
(74) *Attorney, Agent, or Firm* — Perkins Coie LLP; Michael A. Glenn

(57) ABSTRACT

The invention describes a multi-aperture device for detecting an object region having at least two optical channels for detecting a first sub-region of the object region and at least two optical channels for detecting a second sub-region of the object region. The optical channels for detecting the first and second sub-regions are arranged in an interlaced manner in a one-row structure, wherein the first and second sub-regions overlap at least partly.

17 Claims, 16 Drawing Sheets

(56) References Cited

U.S. PATENT DOCUMENTS

| | | |
|---|---|---|
| 2011/0228142 A1 | 9/2011 | Brueckner et al. |
| 2011/0279654 A1* | 11/2011 | Ueda .................... G03B 17/14 |
| | | 348/49 |
| 2012/0307099 A1 | 12/2012 | Yahata et al. |
| 2013/0027520 A1 | 1/2013 | Ono et al. |
| 2014/0071247 A1 | 3/2014 | Imamura et al. |
| 2014/0211079 A1 | 7/2014 | Aoki |

FOREIGN PATENT DOCUMENTS

| | | |
|---|---|---|
| EP | 2806643 A1 | 11/2014 |
| JP | H10170256 A | 6/1998 |
| JP | 2012065161 A | 3/2012 |
| JP | 2012507250 A | 3/2012 |
| WO | 2013047158 A1 | 4/2013 |
| WO | 2013108656 A1 | 7/2013 |
| WO | 2013114890 A1 | 8/2013 |

* cited by examiner

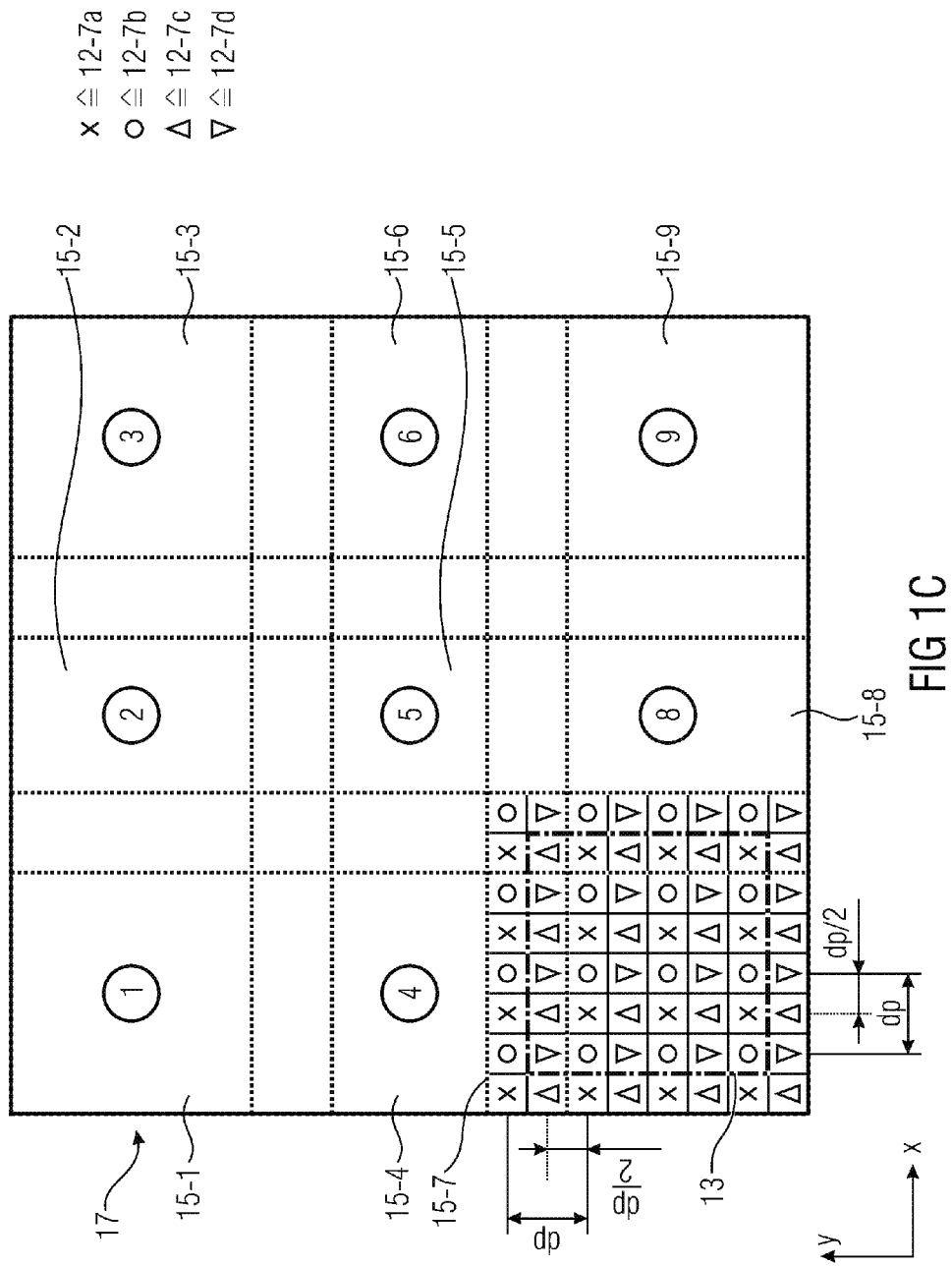

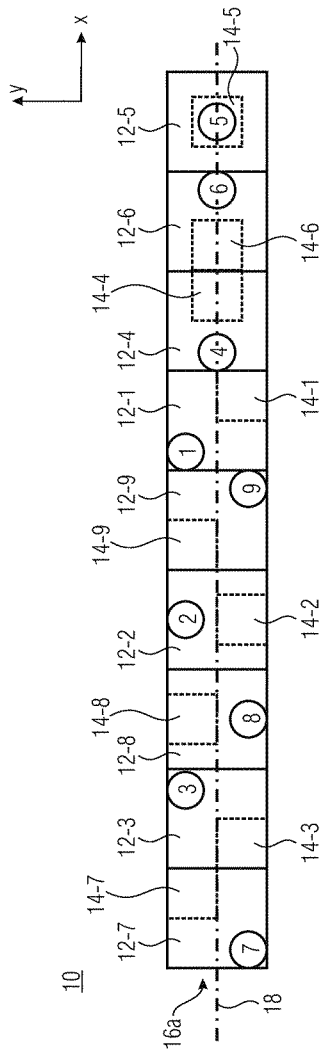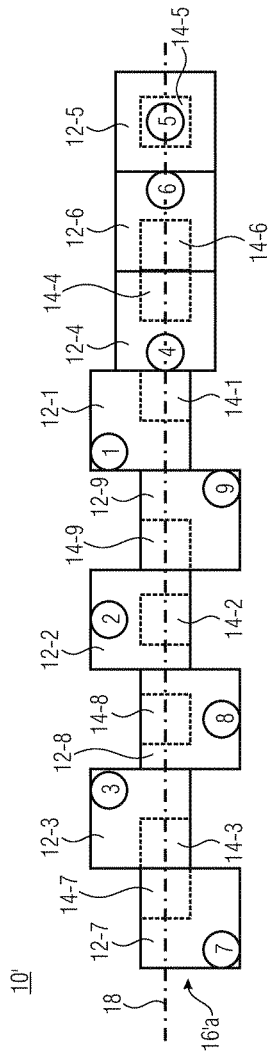
FIG 2A
FIG 2B

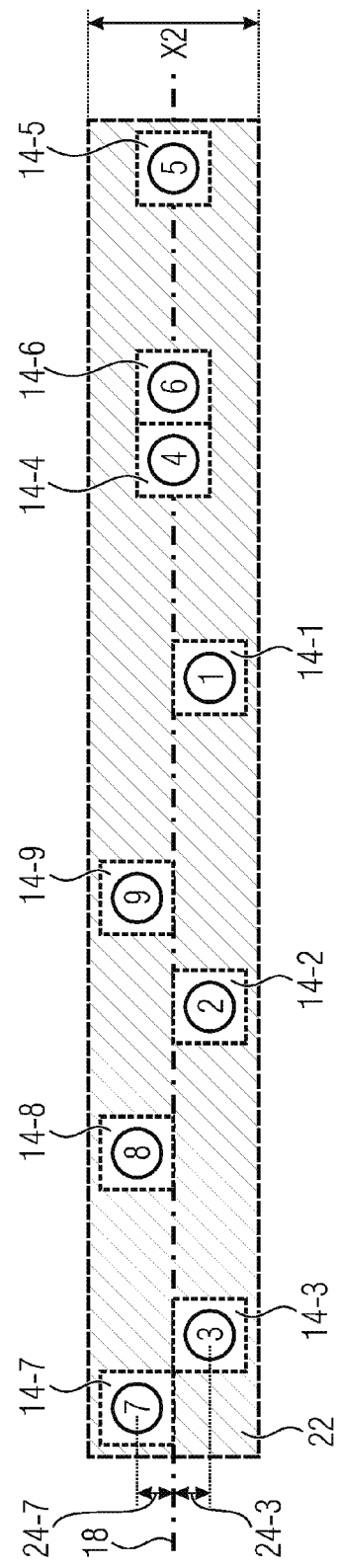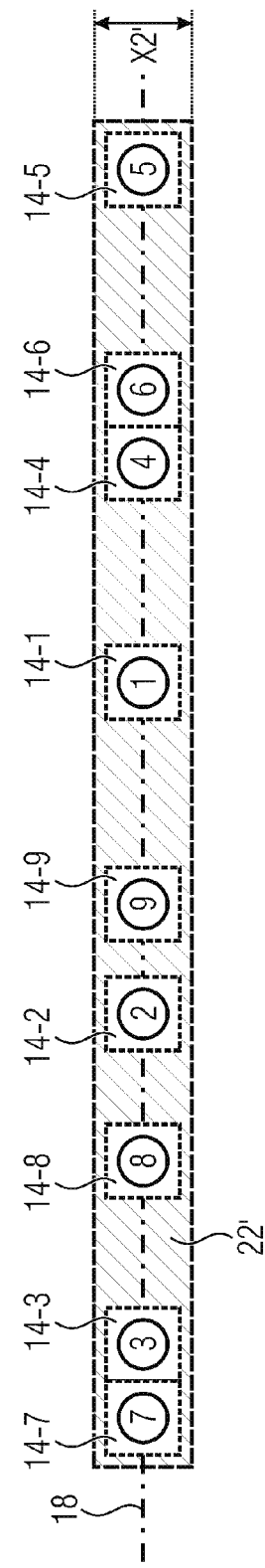

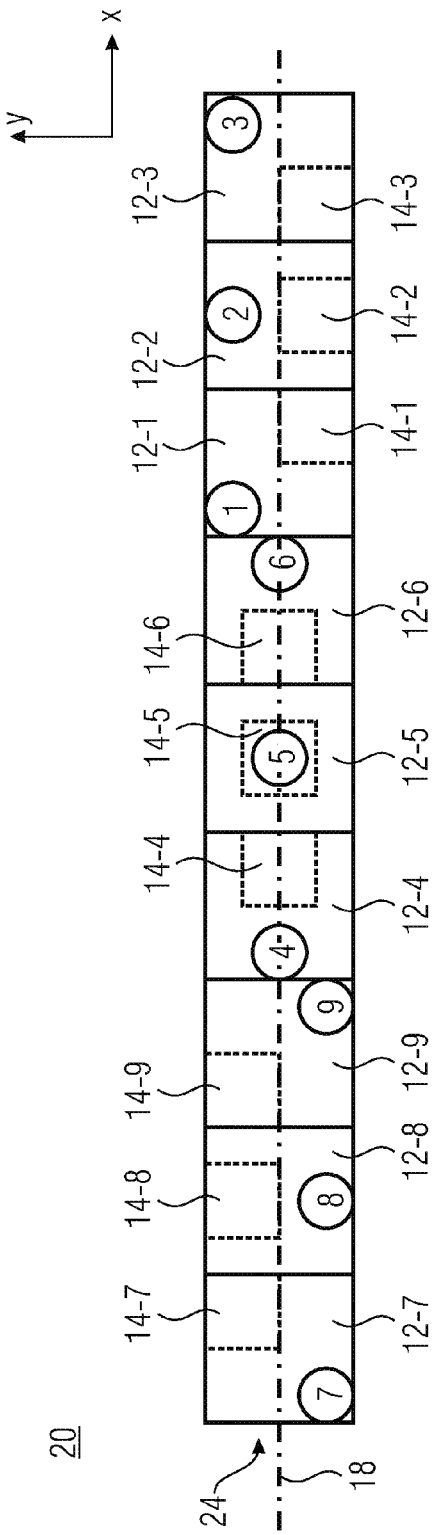
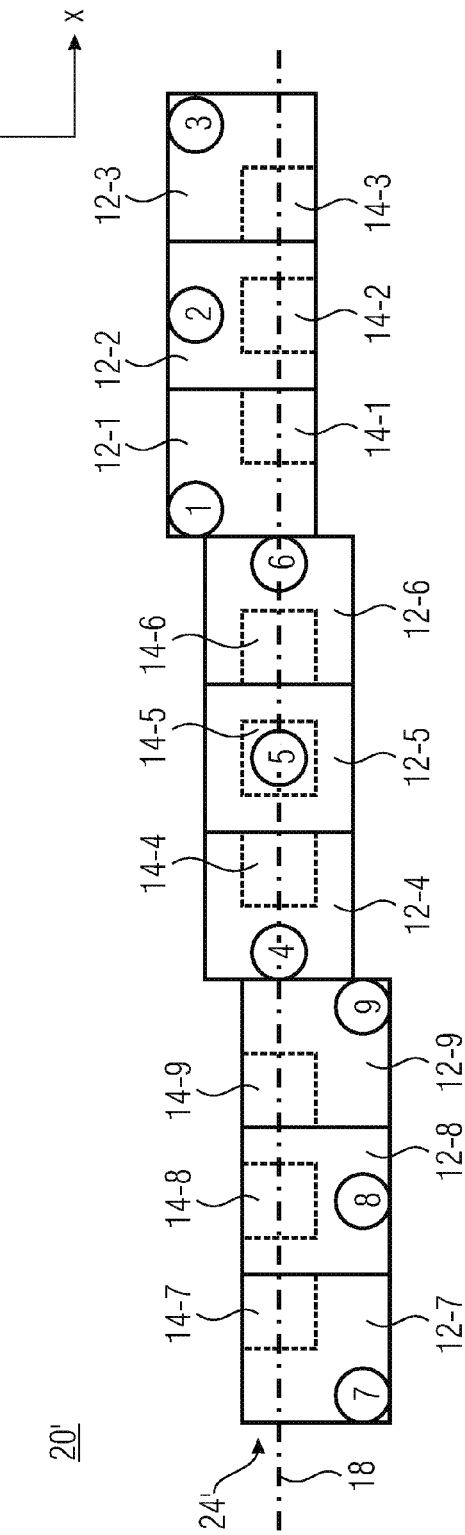

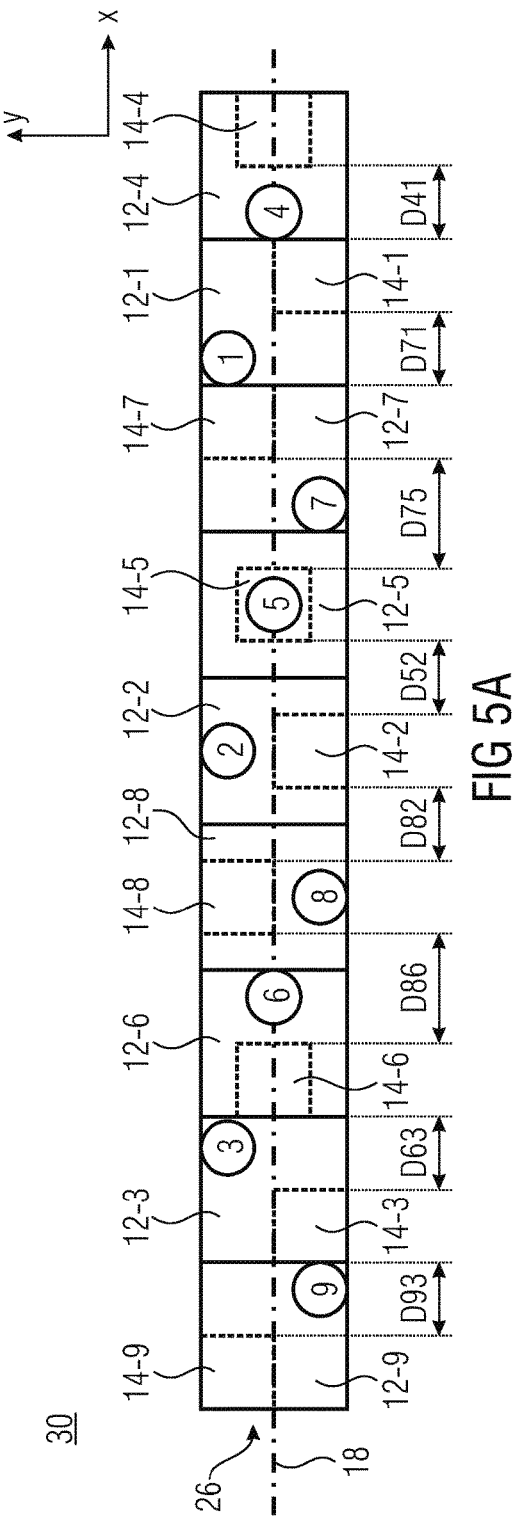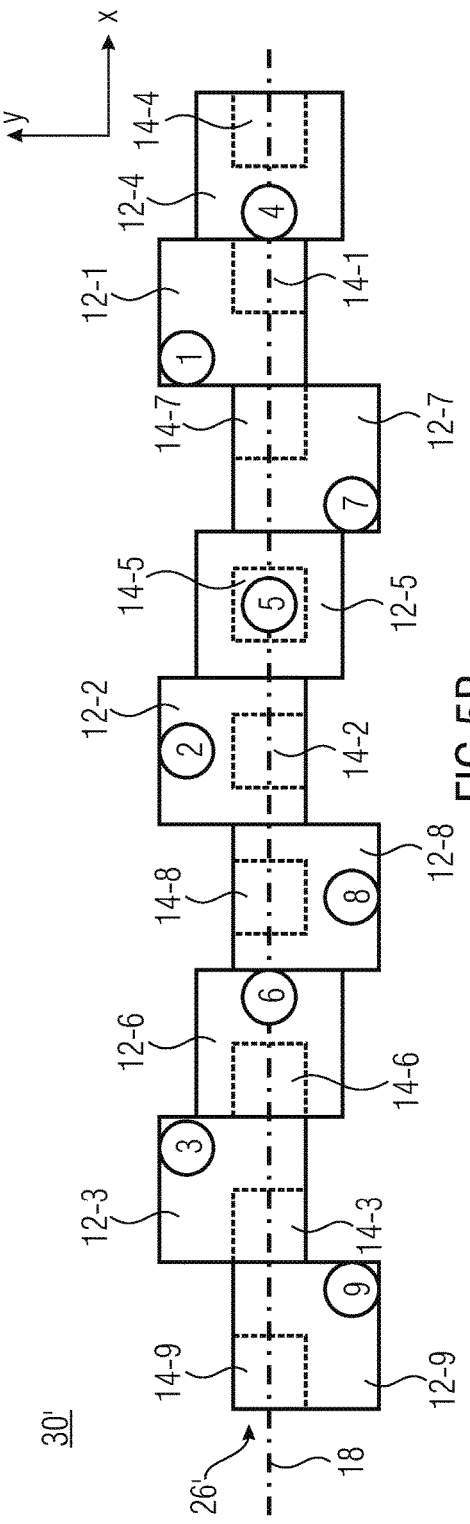

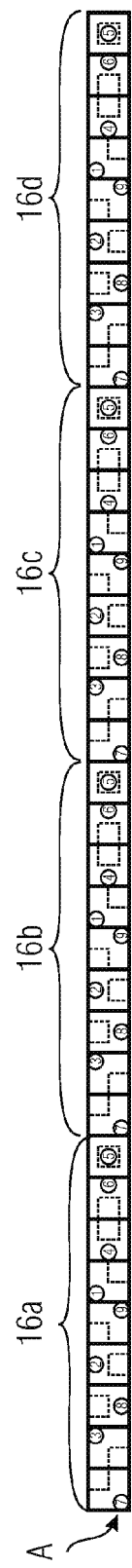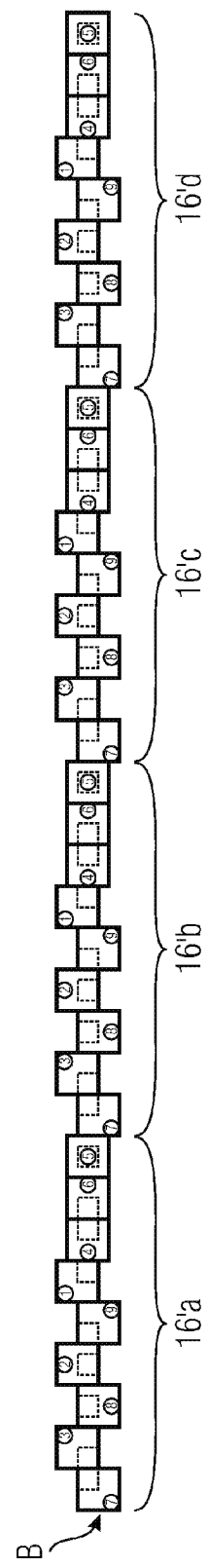
FIG 6A
FIG 6B

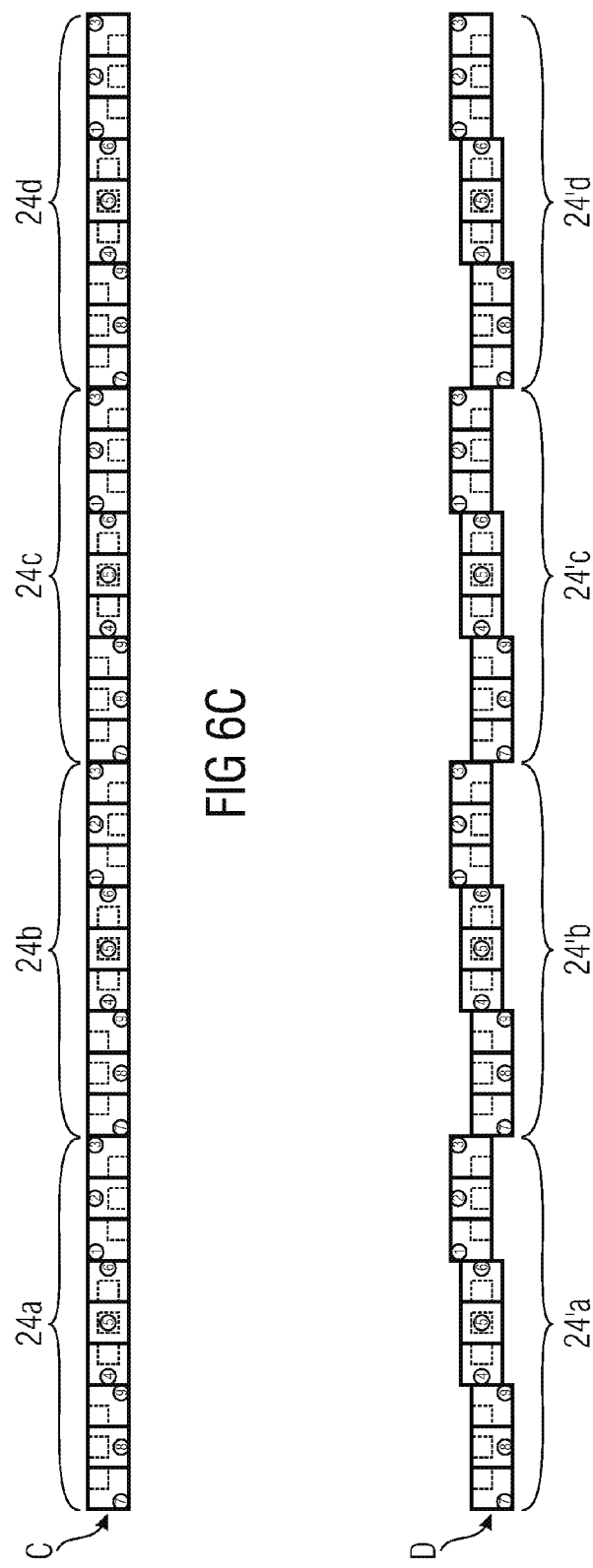

MULTI-APERTURE DEVICE AND METHOD FOR DETECTING AN OBJECT REGION

CROSS-REFERENCE TO RELATED APPLICATIONS

This application is a continuation of copending International Application No. PCT/EP2014/073457, filed Oct. 31, 2014, which is incorporated herein by reference in its entirety, and additionally claims priority from German Application No. 102013222780.9, filed Nov. 8, 2013, which is also incorporated herein by reference in its entirety.

BACKGROUND OF THE INVENTION

The invention relates to a multi-aperture device and to a method for detecting an object region.

Conventional cameras are based on the single-aperture principle. A continuous image of the object is taken here, wherein neighboring regions in the object are also neighboring in the image. In order to record depth information, in most cases two cameras exhibiting a lateral distance to each other are used (stereoscopy). The cameras view the object from different angles (parallax), in correspondence with the distance of the cameras (base length) and the object distance. Consequently, the images of the two cameras are shifted laterally to a different extent to each other (disparity), depending on the object distance. The object distance may be concluded when knowing the base distance of the cameras and the disparity. Increasing the base length advantageously results in an improved depth resolution or a way of differentiating depths in greater object distances. The desired miniaturization of the entire camera setup, however, is counteractive. Furthermore, in practical realizations, the precision of the depth information is limited by the precision of positioning the two cameras relative to each other (precision of base length).

Alternatively, there are array systems pursuant to the super-resolution principle, as are, for example, described under the term Pelican Imaging camera-array (PiCam) in [1]. Such cameras may consist of a plurality of individual imaging channels (2×2, 3×3, 4×4, 5×5, etc.) which each generate an image of the entire object. Generally, such multi-channel setups may be set up in arrangements of N×N or N×M, N and M being greater than or equal to 2. Since the individual cameras of the array exhibit a lateral distance to one another, the same parallax effect results and information on object distances may be gained by means of image processing. Since the array camera as a whole is to be small, for example due to integration in mobile devices, like mobile phones, smartphones, notebooks, etc., the distance between the individual channels of the array camera is small and, consequently, the depth resolution is strongly limited. A goal of the multi-channel setup is reducing the structural height of the camera. A smaller structural height may, for example, be achieved by reducing the focal length f of the imaging channels.

A light-sensitive pixel of a width dp of a camera receives light from the angular region a=arctan(dp/f), wherein the angular region a is also referred to as angle of acceptance. When decreasing the focal length f, the result is a greater angle of acceptance a. Increasing the angle of acceptance a is equivalent to decreasing the resolution, since only fewer object regions may be differentiated among one another. In order not to suffer from a loss in resolution when decreasing the focal length, the principles of super-resolution are applied. A pre-requisite here is aliasing to be present, that is the optics generates point images which are smaller than the pixel pitch, that is the distance between two pixels. The fields of vision of the individual cameras here are shifted by fractions of a pixel pitch. When the width of the point image is smaller than the pixel pitch by the factor N, the fields of vision of the cameras are each shifted by an N-th of the angle associated to a pixel. This means that the optical axes of the individual cameras are each shifted by an N-th of the pixel pitch. The shift here may be performed in the X- and Y-directions, that is there may be $N^2$ cameras with respective sub-pixel shifts. A high-resolution overall image may then be calculated from the sub-scanned sub-images with a sub-pixel offset using image processing in software.

A further alternative are cluster eye cameras (see DE102009049387), as are exemplarily discussed in FIGS. 9 and 10. Cluster eye cameras may, similarly to the array cameras, consist of a plurality of individual channels. However, the channels of the array do not transmit the entire object field, but the individual channels each only view sub-regions thereof. The sub-images of the respective object sub-regions in turn are united to form an overall image by means of image post-processing. The lateral arrangement of the imaging channels with a respective associated visual field sub-region on an image converter is as desired. In contrast to classical single-aperture cameras and even array cameras which really are to be understood to be array arrangements of conventional single-aperture cameras, in these setups the visual field and the lateral position of the image on the electronic image converter are decoupled from each other. In order to reduce the structural height, small focal lengths are used again. The super-resolution method including sub-images shifted by sub-pixels is used here in order not to suffer from a loss in angular resolution.

In a present solution, the imaging channels are arranged such that laterally neighboring channels are also neighboring in the angle of the visual field. The result of this is that, due to the small base distance of the channels, only a small parallax occurs and thus only small shifts of the sub-images which also result in a limited depth resolution may be observed. In order to be able to evaluate the shift of the sub-images, these are to be overlapping partly, that is contain equal image contents in individual regions. The distance between the object and the camera may be concluded from comparing the lateral position of the sub-regions of identical contents in the corresponding imaging channels, when knowing the base length. Since this may be performed for each image point, a depth chart of the object space may be established.

Consequently, the object underlying the present invention is providing a device and a method allowing an object region to be detected with improved depth information.

SUMMARY

According to an embodiment, a multi-aperture device for detecting an object region may have: at least two optical channels for detecting a first sub-region of the object region; and at least two optical channels for detecting a second sub-region of the object region; wherein the optical channels for detecting the first sub-region and the second sub-region are arranged in an interlaced manner in a one-row structure; and wherein the first sub-region and the second sub-region overlap partly and are mutually different in the object region; wherein each optical channel has an image sensor region the position of which on an image converter depends on a position of the sub-region to be detected within the object region, and wherein optical centers of optics of the optical channels are located on a line along individual optical channels and centers of the image sensor regions of the optical channels vary compared to an equidistant and collinear distribution relative to the line; or wherein each optical channel has an image sensor region the position of which on an image converter depends on a position of the sub-region to be detected within the object region, and wherein centers of the image sensor regions of the optical channels are located on a line along individual optical channels and optical centers of optics of the optical channels vary compared to an equidistant and collinear distribution relative to the line.

Another embodiment may have a system having a multi-aperture device as mentioned above.

According to another embodiment, a method for detecting an object region may have the steps of: arranging at least two optical channels for detecting a first sub-region of the object region on an image converter; and arranging at least two optical channels for detecting a second sub-region of the object region on the image converter; wherein the optical channels for detecting the first and second sub-regions are arranged in an interlaced manner in a one-row structure; and wherein the first and second sub-regions overlap partly and are mutually different in the object region; wherein arranging the optical channels takes place such that each optical channel has an image sensor region the position of which on an image converter depends on a position of the sub-region to be detected within the object region, and such that optical centers of optics of the optical channels are located on a line along individual optical channels and centers of the image sensor regions of the optical channels vary compared to an equidistant and collinear distribution relative to the line; or wherein arranging the optical channels takes place such that each optical channel has an image sensor region the position of which on an image converter depends on a position of the sub-region to be detected within the object region, and such that centers of the image sensor regions of the optical channels are located on a line along individual optical channels and optical centers of optics of the optical channels vary compared to an equidistant and collinear distribution relative to the line.

The central idea of the present invention is having recognized that the above object may be achieved by the fact that disparity may be increased by advantageously arranging optical channels on an image converter such that an improved depth resolution of an object region recorded may be achieved.

In accordance with an embodiment, a multi-aperture device comprises at least two optical channels for detecting a first sub-region of an object region, and at least two optical channels for detecting a second sub-region of the object region. The sub-regions of the object region overlap partly. The optical channels for detecting the first and second sub-regions are arranged in one row and in an interlaced, that is alternating, manner such that an optical channel for detecting the second sub-region is arranged between two optical channels for detecting the first sub-region.

It is of advantage with this embodiment that a great lateral distance between optical channels for detecting a sub-region allows an improved depth resolution of the object field. This allows miniaturization of the image detecting devices and/or compensation of the reduction in depth resolution induced by a reduced focal length, for example.

BRIEF DESCRIPTION OF THE DRAWINGS

Embodiments of the present invention will be detailed subsequently referring to the appended drawings, in which:

FIG. 1c is a schematic illustration of the distribution of object regions scanned by the individual channels, as a result of shifting the optical channels relative to the centers of the optics associated thereto which detect an essentially equal sub-region of the object region, for example for optical channels from FIG. 1a;

FIG. 2a is a schematic top view of a section or the portion of the multi-aperture device of FIG. 1a;

FIG. 2b is a schematic top view of the portion of FIG. 2a in which the optical channels exhibit a lateral offset perpendicularly to a row direction such that the image regions of the individual imaging channels are arranged in the same position perpendicularly to the row direction;

FIG. 3a is a schematic top view of a substrate of an image sensor with a potential resulting arrangement of the image sensor regions in accordance with FIG. 2a;

FIG. 3b shows a schematic arrangement of the image sensor regions, as may result from an arrangement of the optical channels in accordance with FIG. 2b;

FIG. 4a is a schematic top view of a section of a multi-aperture device in the form of a portion with an arrangement of the optical channels in accordance with the uniform setup criterion;

FIG. 4b is a schematic top view of a portion as part of a multi-aperture device with sorting of the optical channels in analogy with FIG. 4a, wherein the optical channels exhibit a lateral offset perpendicularly to a row direction such that the image regions of the individual imaging channels are arranged in the same position perpendicularly to the row direction;

FIG. 5a is a schematic top view of a section of a multi-aperture device in the form of a portion with an alternative sorting order of the optical channels;

FIG. 5b is a schematic top view of a portion as part of a multi-aperture device with sorting of the optical channels in analogy with FIG. 5a, wherein the optical channels exhibit a lateral offset perpendicularly to a row direction such that the image regions of the individual imaging channels are arranged in the same position perpendicularly to the row direction;

FIG. 6a is a schematic top view of the multi-aperture device with four portions in accordance with FIG. 2a arranged next to one another along a row structure, wherein the four portions differ among one another in that the channels oriented in roughly the same viewing direction, additionally exhibit a shift between the respective optics and the respective sub-image region by half a pixel pitch in the X- and/or Y-directions;

FIG. 6b is a schematic top view of the multi-aperture device with four portions in accordance with FIG. 2b arranged next to one another along a row structure;

FIG. 6c is a schematic top view of the multi-aperture device with four portions in accordance with FIG. arranged next to one another along a row structure, wherein the four portions differ in that the channels oriented in roughly the same viewing direction additionally exhibit a shift between the respective optics and the respective sub-image region by half a pixel pitch in the X- and/or Y-directions;

FIG. 6d is a schematic top view of the multi-aperture device with four portions in accordance with FIG. 4b arranged next to one another along a row structure;

DETAILED DESCRIPTION OF THE INVENTION

Figure 1A:
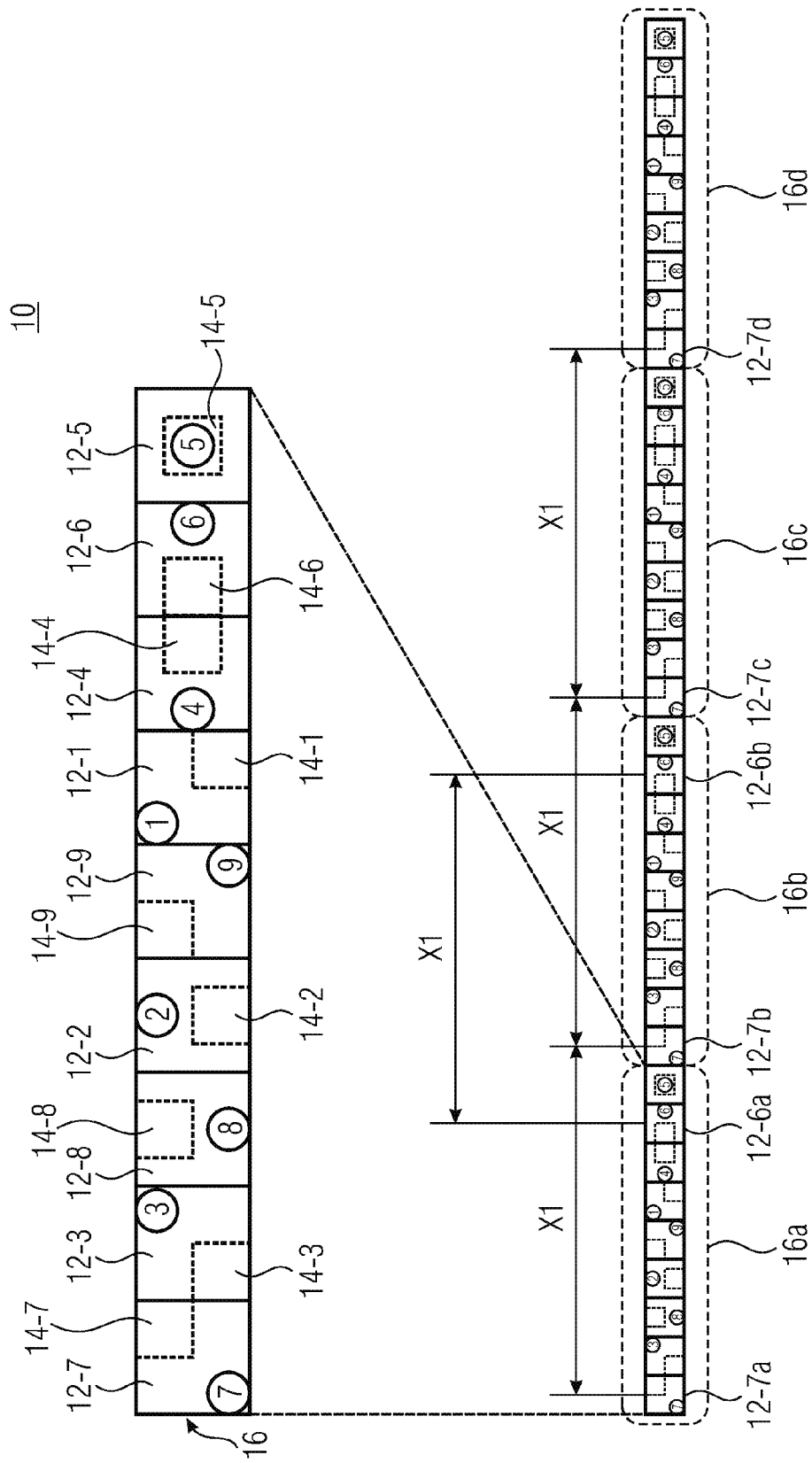
FIG. 1a is a schematic top view of a multi-aperture device comprising a plurality of optical channels and image sensor regions in a row-shaped structure.

Before discussing in greater detail below embodiments of the present invention referring to the drawings, it is pointed out that identical elements, objects and/or structures or those of equal function or equal effect are, in the different figures, provided with same reference numerals such that the description of these elements illustrated in different embodiments is mutually exchangeable or mutually applicable.

In the following discussion, a multi-aperture device is to be understood to be a device for optically detecting an object region, like an image. The multi-aperture device may, for example, be a camera configured to detect an image with several pixels. The multi-aperture approach allows a compact setup of the device. A pixel may, for example be detected by a charge-coupled device (CCD) or a complementary metal oxide semiconductor (CMOS) image sensor. The image sensor may comprise one or several image sensor regions which may be arranged in one or several image converter elements. An optical channel of a multi-aperture device is configured to image a sub-region of the object field onto at least one pixel, that is image sensor region, of the image converter and may comprise an optical element or imaging optics, like a lens, a portion of a decentered lens or a free-form area, with an optical center. Optionally, the optics may comprise a shutter so as to shield scattered light. The shutter here may be arranged between an object to be detected and/or the image converter. The electro-optical sensor is configured to detect the object region or electromagnetic radiation received from the object region. The electromagnetic radiation may exhibit a visible and/or non-visible wavelength range. Thus, the wavelength range may, for example, also be the ultraviolet or infrared range. The optics may also be a combination of several lenses, several portions of decentered lenses and/or several free-form areas. The optical element of an optical channel here may be arranged relative to at least one further optical channel such that imaging of a sub-region onto at least two image sensor regions by a common lens, for example, is possible. Alternatively, the optical element may be arranged only relative to an optical channel.

FIG. 1a shows a schematic top view of a multi-aperture device 10 comprising a plurality of optical channels 12-1 to 12-9, as are indicated by the square continuous lines. An optical channel is configured to detect a sub-region of the object region each and includes an image sensor region 14-1 to 14-9 each on an image converter, as is indicated by the broken lines within the optical channels. A respective image sensor region 14-1 to 14-9 of an optical channel 12-1 to 12-9 may comprise a smaller area than that of a lens for focusing the light or radiation received from the sub-region, which is why an area of the image sensor region 14-1 to 14-9 may be smaller than an area of the optical channel 12-1 to 12-9. Several sub-image converters 14-1 to 14-9 may be arranged on a common substrate (single chip). As is indicated by the different orientations of the image sensor regions 14-1 to 14-9 within the optical channels 12-1 to 12-9, the optical channels 12-1 to 12-9 comprise a mutually different viewing angle, that is the optical channels 12-1 to 12-9 are configured to detect a mutually different sub-region of the object region. As is also indicated by the broken squares and the numbering of the optical channels, the optical channels 12-1 to 12-9 are arranged such that neighboring sub-regions of the object region, like, for example, ⑦ and ⑧ or ⑧ and ⑨, overlap. Overlapping sub-regions allow the connections to be evaluated, that is the equal image contents in different sub-regions, to be evaluated, in order to be able to conclude depth information and extract the image information from the sub-images and, thus, put together the overall image of the overall object. In a simplifying manner, the image sensor regions 14-1 to 14-9 are illustrated with a dimension in the X- and Y-directions of 50% of the optical channels 12-1 to 12-9. Alternatively, the dimensions of the image sensor regions 14-1 to 14-9 in the X- and/or Y-directions may exhibit any proportion relative to dimensions of the optical channels 12-1 to 12-9. Positions of the image sensor regions may be positioned in dependence on a position of the center of the optical centers of the optical element within the base area of the respective optical channel.

Alternatively, it is also conceivable for the overall visual field, that is the object region, to comprise a number of sub-regions in the X- and Y-directions differing from three, that is any number. In addition, it is also conceivable for the object region to be divided in the X- and Y-directions into a different number of sub-regions, for example 5×3, 15×10 or 1920×1028.

A detailed view of a portion 16a shows nine optical channels 12-1 to 12-9 which each include an image sensor region 14-1 to 14-9. Based on the viewing direction of the respective optical channel, the image sensor region 14-1 to 14-9 is shifted within a base area of the optical channels 12-1 to 12-9, as is indicated by the broken lines. Numbering within the optical channels only serves to illustrate the arrangement of the sub-regions and simplified differentiation between the optical channels. Depending on the orientation, that is viewing direction of the respective optical channel 12-1 to 12-9, as is indicated by the numbering ① to ⑨, the optical channels 12-1 to 12-9 are configured to detect nine sub-regions. Alternatively, the object region may also comprise 2, 3, more than 10, more than 1,000 or more than 1,000,000 sub-regions. Each sub-region is detected by a number corresponding to the number of portions 16*a-d*, like four in the example illustrated.

The multi-aperture device 10 exemplarily comprises four portions 16*a-d* with an identical sorting order of the optical channels 12-1 to 12-9 which each comprise an optical channel 12-1 to 12-9 for detecting a sub-region such that the number of optical channels is, among other things, identical. In other words, each sub-region 16*a-d* comprises an optical channel 12-1 to 12-9 each, wherein the optical channels 12-1*a* to 12-9 are arranged to be laterally neighboring in a single-row structure. In other words, the device 10 comprises a plurality of camera arrays, the optical channels or portions 16*a-d*. The four sub-regions 16*a-d* are each arranged to be laterally neighboring such that the overall number of optical channels are also arranged to be laterally neighboring to one another in a row. The arrangement of the optical channels 12-1 to 12-9 is in a single row, which may also be described as a 1×N form.

The number of portions 16*a-d* may result from a super-resolution factor to be achieved. In the example illustrated, it is 2 each, both in an X- and in a Y-direction of the object region, as is, for example, discussed in greater detail in FIG. 9. In order to achieve the increase in resolution by the super-resolution factor desired, a corresponding number of optical channels may be implemented in the X- and Y-directions, wherein the respective channels 12-7*a*, 12-7*b*, 12-7*c* and 12-7*d* basically view the same object region. The image sensor regions 14-1 may be shifted in the respective sub-regions, that is portions, 16*a-d* relative to their associated optical channels 12-7*a-d* in the X- and/or Y-directions by half a pixel, that is with a pixel pitch corresponding to half an extension of the pixel in a direction laterally to a row direction. Thus, the image sensor regions 14-1 of the portions 16*a* and 16*b* may differ relative to the channels 12-7 associated thereto by half a pixel in the X-direction and/or the Y-direction and not differ in the Y-direction, the image sensor region 14-1 of the portion 16*c* may differ from the image sensor region 14-1 of the portion 16*a* by half a pixel in the Y-direction and/or the X-direction, and the image sensor region 14-1 of the portion 16*d* may, for example, differ relative to the image sensor region 14-1 of the portion 16*a* by half a pixel in both the X- and the Y-directions. The number of portions 16 may thus also be referred to as a product of the super-resolution factors in the X- and Y-directions, wherein the factors, in integers, may differ.

Optical channels 12-7*a*, 12-7*b*, 12-*c* and/or 12-7*d* for detecting an essentially equal sub-region of the object region may exhibit any lateral offset relative to one another in a direction perpendicularly to the row direction or perpendicularly to a direction of the distance X1. When this distance is a fraction, such as, for example, ¼, ⅓ or ½, of a distance between two pixels, that is sub-image regions (sub-pixel pitch), this offset may also be referred to as sub-pixel offset or sub-pixel pitch. The sub-pixel pitch may exemplarily be based on the super-resolution factor. When, for example, a super-resolution factor of two is realized and a sub-region of the object region in the X- and Y-directions is detected two times, the sub-pixel pitch may, for example, correspond to ½ of the pixel width. The offset may, for example, be used to increase a resolution of the object region in a sub-pixel region. In other words, due to the interlacing of the optical channels, it is possible for the scan gaps of an optical channel to be detected by a neighboring optical channel. Alternatively, the optical channels for detecting an essentially equal sub-region 12-7*a*, 12-7*b*, 12-*c*, and/or 12-7*d* may also be arranged with no offset therebetween.

Due to the offset in the viewing angle (parallax) of optical channels 12-7*a*, 12-7*b*, 12-*c* and/or 12-7*d* onto the same object point, that is the same sub-region, sub-pixel shifting relative to an image sensor region may be obtained which may compute a high-resolution overall image by means of a super-resolution algorithm from the plurality of low-resolution micro-images per optical channel 12-7*a*, 12-7*b*, 12-*c* and/or 12-7*d*. In other words, center points of the image sensor regions 14-7 of the optical channels 12-7*a*, 12-7*b*, 12-*c* and/or 12-7*d* may be arranged to be shifted such that at least two of the optical channels 12-7*a*, 12-7*b*, 12-7*c* and/or 12-7*d* with a pixel pitch or a fraction of a pixel pitch exhibit different, partly overlapping detection regions. An overlap region of the detection regions of two optical channels 12-7*a*, 12-7*b*, 12-7*c* and/or 12-7*d* may thus be imaged onto an image detection sensor in an offset manner.

The device 10 may be referred to as comprising a super-resolution factor of 2, that is $2^2=4$ portions 16*a-d*, which means that both the X- and the Y-directions of the object region or each sub-region of the object region is detected four times. By the lateral spacing between the optical channels for detecting a sub-region, such as, for example, 12-7*a*, 12-7*b*, 12-*c* and/or 12-7*d*, these optical channels may exhibit a shift within the sub-region detected, wherein the optical channels 12-7*a*, 12-7*b*, 12-7*c* and 12-7*d* are configured to detect at least basically the same sub-region. In other words, each sub-region of the object region is detected four times, which may correspond to double scanning in the X-direction and double scanning in the Y-direction of the object region.

The identical sorting order of the sub-regions 16*a-d* and, thus, the optical channels which detect an at least approximately equal sub-region of the object field, like the optical channels 12-7*a*, 12-7*b*, 12-7*c* and 12-7*d*, allow the greatest lateral distance possible along an implementation of the row structure. As is indicated by the distances of the image sensor regions 14-1 to 14-9 along the implementation of the row structure, optical voids, that is clearances, may be formed between the image sensor regions 14-1 to 14-9 of the optical channels 12-1 to 12-9. Non-light-sensitive electronical components, such as readout circuits, analog-to-digital converters (ADCs), amplifiers, etc., may be arranged in these clearances, that is in the regions between the sub-image converters, for example.

Each optical channel of a portion 16*a-d* is configured to detect a sub-region of the object region, wherein neighboring sub-regions in the object region overlap partly. The arrangement of the optical channels in the portions 16*a-d* is interlaced and uniform such that a distance X1 for optical channels which detect the same or essentially the same sub-region is constant, like, for example, for the optical channels 12-7*a* to 12-7*d* or 12-6*a* and 12-6*b*.

The distance X1 may be referred to as both a maximum and an equidistant distance, since it applies for each sub-region 16a-d and each optical channel of the respective sub-region.

In addition, one or several optical channels may comprise a transmission filter, such as, for example, a color filter, configured to filter, that is reduce or minimize, one or several wavelength ranges outside the transmission region. Thus, a sub-region of the object region may, for example, be detected relative to two or several different wavelength ranges. A transmission filter may, for example, be arranged per pixel, that is at a single optical channel 12-1 to 12-9, for example by being arranged in a well-known "Bayer Mosaic" for an optical channel 12-7a, 12-7b, 12-7c or 12-7d or for two or more optical channels for detecting a sub-region 12-7a, 12-7b, 12-7c and/or 12-7d. A transmission filter may, for example, be integrated in a micro-lens objective of the respective optical channel or on the image sensor region associated thereto. Such a transmission filter allows associating a spectral color to an optical channel 12-1 to 12-9 or 12-7a, 12-7b, 12-7c or 12-7d.

In other words, the imaging channels which transmit the approximately equal object regions or those offset only by a part of the visual field of a pixel, in the strip-shaped arrangement, are in a maximum distance of X1 to one another. This allows achieving a large to maximum disparity and thus an improved to best-possible depth resolution in this regard.

In other words, the optical channels with an approximately identical viewing direction and, thus, approximately identical image contents, as is indicated in FIG. 1a by equal numbering, are arranged at the greatest lateral distance possible. This results, for example, in the linear arrangement shown. In order to be able to establish a depth chart, each object point is imaged by at least two channels, for example four. The shift of the sub-images depending on the object distance is maximum as a consequence of the maximum lateral distance such that an optimum depth resolution may be achieved. The multi-aperture device 10 is, in contrast to the known technology, freed from a correlation between an image position on the image converter and the viewing direction of the respective optical channel so as to achieve the best depth resolution possible. The image region sensors may be manufactured on the wafer level, thereby allowing a cheap realization of the apparatus. A linear arrangement of the image region sensors allows maximizing distances between imaging channels which contain at least partly equal image information. Here, a maximum base width and, thus, an optimum depth resolution may be achieved with an approximately equal chip area, compared to matrix sensors.

Sorting the optical channels 12-1 to 12-9 within a row portion may take place as desired or in accordance with different criteria, as is discussed, for example, in FIGS. 2, 4 and 5.

Each optical channel 12-1 to 12-9 may comprise a separate optical element, due to the mutually different viewing directions of neighboring optical channels 12-1 to 12-9.

Alternative embodiments exhibit multi-aperture devices comprising a larger number of optical channels. Thus, multi-aperture devices may detect an object region having a number of more than 1,000, more than 100,000, more than 1,000,000 or more than 10,000,000 pixels and, thus, comprise a corresponding number of optical channels. A number of portions 16a-d where the optical channels are partly arranged may, in accordance with the super-resolution principle, be a square of a natural number, such as, for example, $2^2$, $3^2$ or $4^2$. Alternatively, it is also conceivable for a different number of portions to be arranged in the multi-aperture device, like 2, 3, 5, 7 or 11.

Possible forms of application of the device may, for example, be made possible in gesture recognition, 3D imaging, man-machine interfaces, in apparatuses or systems including image detection, or a camera. Potential apparatuses or systems may, for example, be mobile devices, like mobile phones, smartphones, laptop computers, tablet computers, game consoles, automotive applications, data glasses. Immobile applications may, for example, be customer recognition in machines or automatic machines.

In other words, FIG. 1a shows an imaging system, of a small setup, with an optimized gain of depth information resulting from a largest base length possible. The optical channels of the multi-aperture setup may thus comprise a linear arrangement, that is be arranged, at least in portions, in a row.

It is of advantage with this embodiment that the multi-aperture system/device may operate passively and an illumination of the object field may be omitted. In other words, the object field may be illuminated naturally or artificially, such as, for example, by a flashlight, in order to detect the object region such that a structured illumination or runtime measurement for establishing a depth chart of the object region may be omitted.

Figure 7:
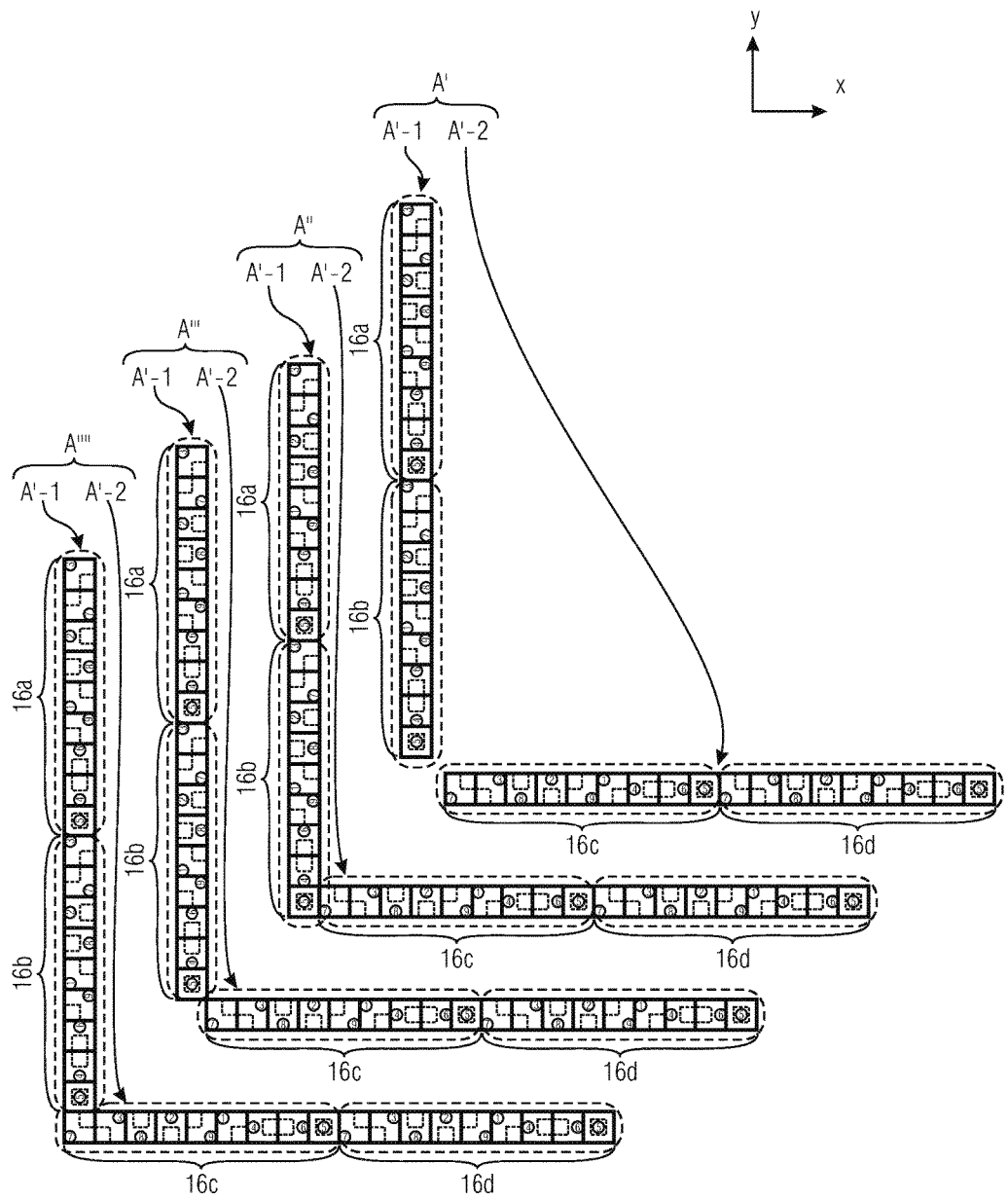
FIG. 7 shows four schematic views of an alternative arrangement of the portions of the variation of FIG. 6a, wherein the four portions differ in that the channels oriented in roughly the same viewing direction additionally exhibit a shift between the respective optics and the respective sub-image region by half a pixel pitch in the X- and/or Y-directions.

The individual portions of the multi-aperture device 10 may, as an alternative to the above expositions, also be arranged in an angle to one another and, optionally, spaced apart from one another, as is shown, for example, in FIGS. 7 and 8. This may, for example, be of advantage when a lateral dimension along a row structure in a mobile device is limited.

Figure 1B:
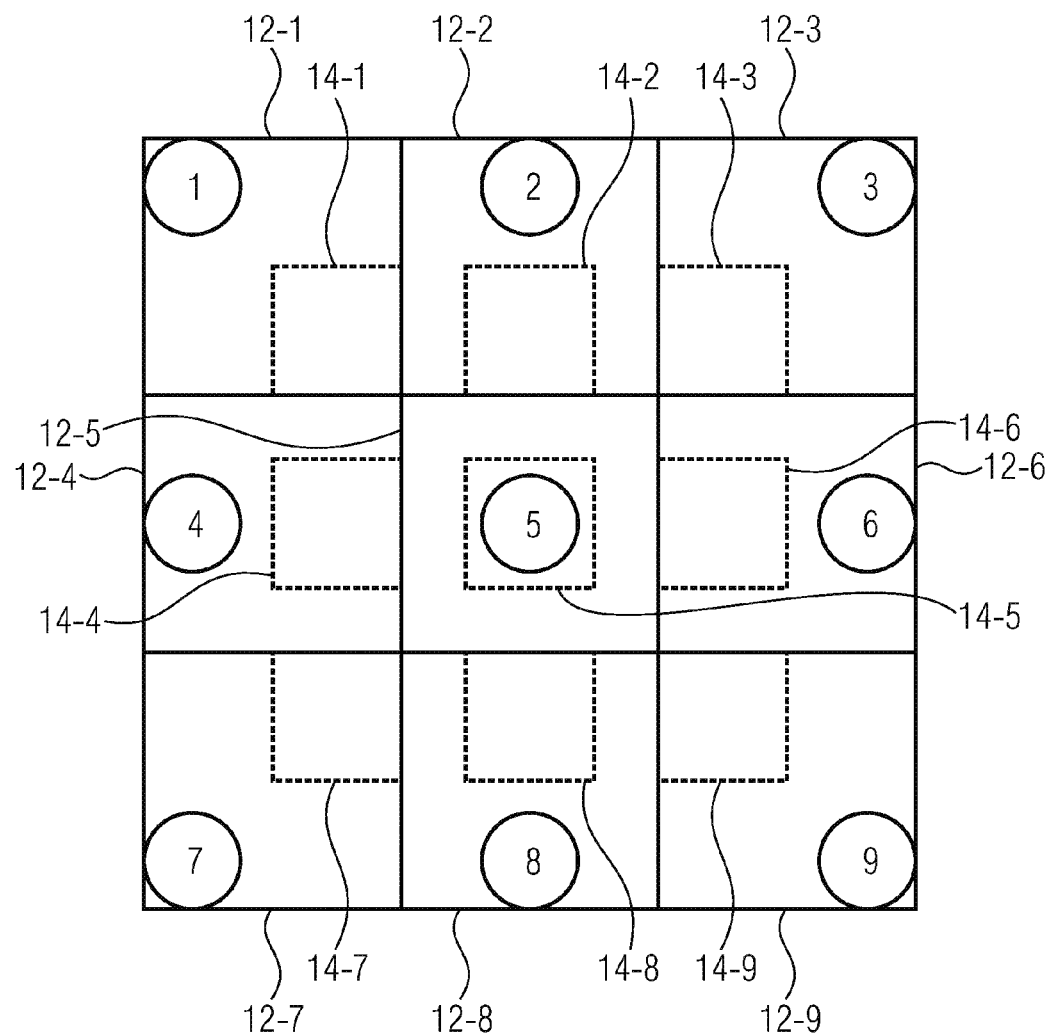
FIG. 1b is a schematic illustration of a two-dimensional arrangement of optical channels on an image sensor for detecting an object region in which the arrangement of the image sensor regions corresponds to a position of the sub-region within the object region.
Figure 9:
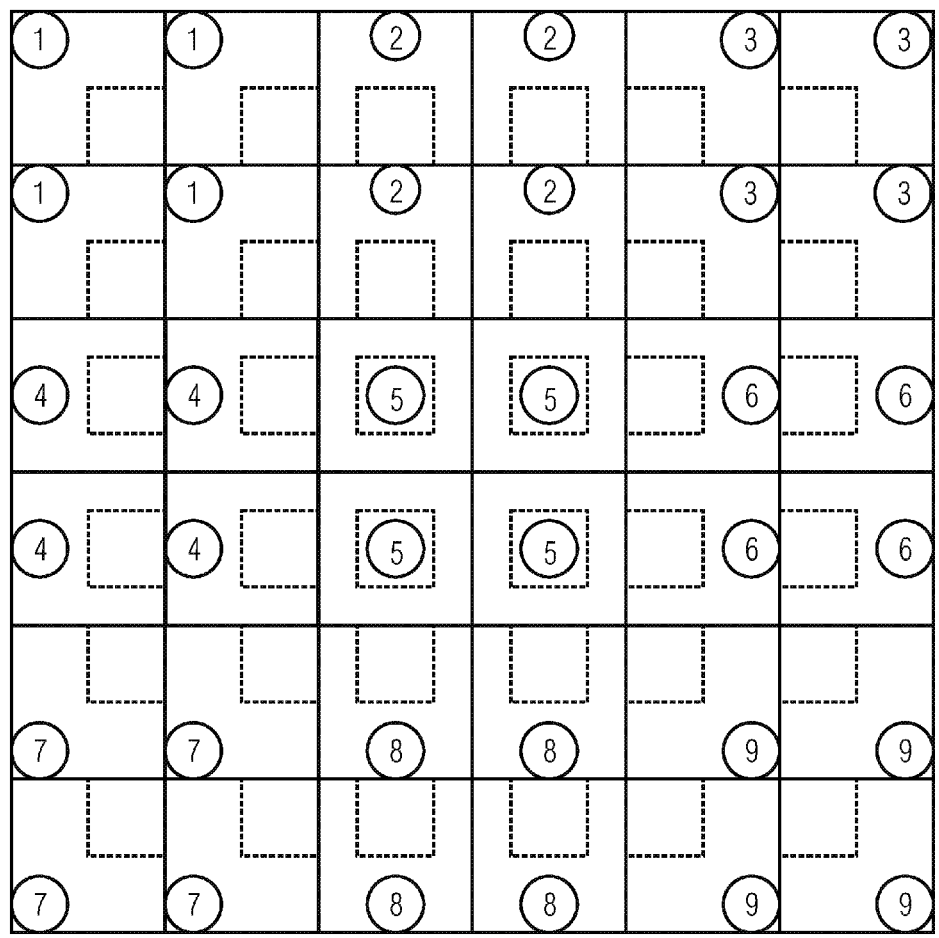
FIG. 9 is a schematic view of an exemplary multi-channel imaging system in accordance with the known technology.

FIG. 1b shows a schematic illustration of a two-dimensional arrangement of optical channels 12-1 to 12-9 on an image sensor for detecting an object region, wherein the arrangement of the image sensor regions 14-1 to 14-9 corresponds to a position of the sub-region within the object region. Such an arrangement is described in DE 10 2009 049387, for example. Each of the optical channels 12-1 to 12-9 is configured to detect a different sub-region of the object region, as is indicated by the respective shifted image sensor regions 14-1 to 14-9. In other words, each of the optical channels 12-1 to 12-9 exhibits a different viewing direction onto the object region. The sub-regions of neighboring optical channels, like 12-1 and 12-2 or 12-5 and 12-6 or 12-4 and 12-7, overlap partly, which means that neighboring optical channels detect partly equal image contents so as to be able to draw conclusions as to an object distance. FIG. 1b only shows an arrangement of optical channels for illustrating the influences of different viewing directions of optical channels. When the object region is detected with a subdivision in accordance with FIG. 1b and a super-resolution factor of 2 each in the X- and Y-directions, the optical channels may be arranged similarly to what is shown in FIG. 9, for example. FIGS. 1b and 9 represent known technology and serve for illustrating channel subdivision. The optical channels 12-1 to 12-9 are sorted such that optical channels 12-7a, 12-7b, 12-7c and 12-7d which are associated to an approximately equal object region, are separated from one another by a maximum distance of X1 within the row, that is row structure.

FIG. 1c shows a schematic illustration of the distribution of object regions scanned by the individual channels, as a consequence of shifting the optical channels relative to the centers of the optics associated thereto which detect an essentially equal sub-region 15-7 of the sub-regions 15-1 to 15-9 of the object region 17, for example for the optical channels 12-7a to 12-7d of FIG. 1a. The sub-regions 15-1 to 15-9 are arranged in the object region 17 such that the sub-regions 15-1 to 15-9 overlap partly. The image sensor regions of the optical channels 12-7a to 12-7d, for example, are each configured to detect a number of 4×4 pixels, that is 4 pixels in an X-direction of the object region 17 and 4 pixels in a Y-direction of the object region 17. The 4×4 pixels of the optical channel 12-7a are characterized by the symbol x, the 4×4 pixels of the optical channels 12-7b by the symbol o, the 4×4 pixels of the optical channel 12-7c by the symbol Δ and the 4×4 pixels of the optical channel 12-7d by a symbol Δ inverted by 180° in a clockwise direction, which subsequently will be referred to as inverted Δ.

The optical channels 12-7a to 12-7d are configured to basically detect the same sub-region 15-7. The individual pixels x, o, Δ or inverted Δ exhibit a pixel pitch dp to one another, that is within the respective optical channel. The optical channels 12-7a to 12-7d are shifted laterally, that is in one of an X- and/or Y-direction, relative to one another by a fraction (dp/2) of the pixel pitch dp, that is by the sub-pixel shift or by the sub-pixel offset such that a pixel with the symbol x, for example, exhibits a distance of the fraction dp/2 to a neighboring pixel with a symbol o or Δ.

In other words, when, for example, the optical channels 12-7a to 12-7d exhibit a similar or identical setup, the center points of different image sensor regions of the respective optical channels 12-7a to 12-7d and/or the imaging optics thereof may be shifted relative to one another by the fraction. Detection regions shifted in this way, that is regions detected by an optical channel 12-7a, 12-7b, 12-7c or 12-7d, comprise an overlap region 19. The overlap region 19 may be imaged onto an image sensor in an offset manner, as is discussed in FIGS. 3a and 3b, for example.

The fraction here may be dependent on a super-resolution factor realized. Alternatively, the fraction, or sub-pixel shift, may be a different fraction of the pixel pitch dp.

As an alternative to the above expositions, one or several of the optical channels 12-7a to 12-7d may also exhibit no or approximately no shift relative to one another such that the fraction of the pixel pitch becomes small, like (1/10, 1/20 or 1/200) or even zero. In this case, two or more of the symbols x, o, Δ or inverted Δ are located one above the other. In embodiments, this may, for example, be of advantage when different optical channels comprise different transmission filters and detect different colors of the respective sub-region 15-7, for example.

FIG. 2a shows a schematic top view of a section, for example the portion 16 of the multi-aperture device 10, with a sorting of optical channels 12-1 to 12-9 as is shown in FIG. 1a. Two neighboring optical channels, like 12-7 and 12-3, 12-8 and 12-2, 12-9 and 12-1 or 12-4 and 12-6 may exhibit a maximum angular distance relative to the respective position of the image sensor region of the optical channel, for example 180° for the optical channels 12-7 and 12-3. In other words, the viewing directions of two neighboring optical channels are rotated or mirrored by up to 180°. Neighboring optical channels, like 12-3 and 12-8 or 12-2 and 12-9, for example, exhibit an angular distance between 90° and 180° to each other and thus an angular distance increased relative to an arrangement as is illustrated in FIG. 9, for example.

In other words, neighboring optical channels 12-1 to 12-9 of the portion 16a are arranged such that they may exhibit a maximum difference in their viewing directions.

The optical channels 12-1 to 12-9 may, as is illustrated in FIG. 2a, be arranged such that center points of the respective optical channels 12-1 to 12-9, that is the optical center points, are arranged along or on a straight line 18. This means that distances of the center points of the image sensor regions 14-1 to 14-9 may vary relative to the line 18. In other words, the center points of the optical channels 12-1 to 12-9 are collinear.

FIG. 2b shows a schematic top view of a portion 16'a of a multi-aperture device 10'. The sorting order of the optical channels along the line 18 is identical to the sorting order of FIG. 2a. In contrast to FIG. 2a, the optical channels 12-1 to 12-9 are offset in the X-direction along the linear arrangement of the row structure so that center points or centers of the image sensor regions are arranged to be collinear to the line 18.

Alternatively, both the centers of the optical channels 12-1 to 12-9 and the image sensor regions 14-1 to 14-9 may be arranged to be partly or completely spaced apart from the line 18. The center points or centers may, in the case of square cross-sections of the optical channels 12-1 to 12-9 or the image sensor regions 14-1 to 14-9 be determined using the point of intersection of the connective lines of two diagonal lines which connect two opposite corners of the square each. Alternatively or with alternatively formed optical channels 12-1 to 13-9 or image sensor regions 14-1 to 14-9, the centers may, for example, be determined using the geometrical centroid or center point. Alternatively, a longitudinal center line of an optical channel 12-1 to 13-9 or image sensor region 14-1 to 14-9 may be used for describing the collinear or arrangement from spaced apart the line 18.

With regard to an image converter region, that is an image converter or sensor area, an arrangement of optical channels 12-1 to 12-9, as is indicated in FIG. 2b, may be of advantage since a sensor area necessitated, like of a CCD or CMOS sensor, may be reduced, as is illustrated in FIG. 3.

In other words, in FIG. 2b, the optical channels are arranged in the same order like in FIG. 2a, but shifted in the Y-direction, that is laterally to the row direction, such that the center points of the sub-imagers, that is the image sensor regions 14-1 to 14-9 are located on the line 18 and an envelope of the active sub-imager area may thus exhibit a minimum extension in the Y-direction. This may achieve a smallest height, that is a minimum area consumption of the strip-shaped image sensor.

FIGS. 2a and 2b only show a partial view of the overall device 10 and 10'. All in all, in dependence on a super-resolution factor, a row may consist of several, for example, four cells, that is portions, 16 or 16' which may be arranged one after the other or in an angle to one another. The sub-imagers, that is image sensor regions 14-1 to 14-9, are shifted in an X/Y-direction of the object region by a width of a respective pixel divided by the super-resolution factor, like dp/2, for example.

FIG. 3a shows a schematic top view of a substrate 22 of an image sensor with a potential resulting arrangement of the image sensor regions 14-1 to 14-9 on the substrate 22. The arrangement may, for example, result from arranging the optical channels 12-1 to 12-9 in accordance with FIG. 2a. In other words, the image sensor regions 14-1 to 14-9 are arranged identically to FIG. 2a. The optical channels 12-1 to 12-9 are represented only by the image sensor region 14-1 to 14-9 so as to illustrate a resulting area consumption of the substrate 22.

By varying the distance between the image sensor regions 14-1 to 14-9 from the line 18, a width X2 of the substrate 22 results in dependence on the minimum and/or maximum distance. The dependence of the extension of the width X2 on the distances of the center points of the image sensor regions 14-1 to 14-9 is illustrated exemplarily using the distances 24-3 of the image sensor region 14-3 from the center line 18, and using the distance 24-7 of the center point of the image sensor region 14-7 from the center line 18. An increase in the distance 24-3 or the distance 24-7 may result in an increase in the width X2. The image sensor regions 14-4, 14-5 and 14-6 exhibit a distance between the center points of the image sensor regions 14-4, 14-5 and 14-6 and the center line 18 of nearly zero such that respective maximum values of the distances of the remaining image sensor regions influence the width X2.

In other words, the centers of the sub-imagers in FIG. 3*a* may not be located on a line. FIG. 3*b* shows the arrangement of the image sensor regions 14-1 to 14-9 as may result from arranging the optical channels in accordance with FIG. 2*b*. An arrangement of the center points of the image sensor regions 14-1 to 14-9 along the line 18 may result in a width X2' of a substrate 22' which, compared to the width X2 in FIG. 3*a*, is decreased. This may result in a reduced surface area of the substrate 22' compared to the surface area of the substrate 22 in FIG. 3*a* and, thus, in a smaller sensor surface area of the image converter.

A reduction or minimization of the area consumption of the substrate 22 or 22' may be achieved by the arrangement of the center points of the image sensor regions 14-1 to 14-9, which may result in savings in material and, consequently, a reduction in costs and/or setup size. A high fill factor of the image sensor may, for example, be described by a ratio of the overall area of all the pixels arranged on the image sensor relative to the overall area of the image sensor.

In other words, the centers of the sub-imagers are located on a line resulting in an envelope, that is an outer edge of the substrate 22', with a small or minimum extension X2 perpendicularly to the line 18 in the Y-direction. The result of this is a smaller area consumption of the substrate 22' on which the sub-images, that is image sensor regions 14-1 to 14-9, are arranged and, thus, an optimum fill factor, that is area efficiency of the substrate.

FIG. 4*a* shows a schematic top view of a section of a multi-aperture device 20 in the form of a portion 24 with an arrangement of the optical channels 12-1 to 12-9 and the image sensor regions 14-1 to 14-9 in accordance with a uniform setup criterion. Considering the arrangement of the optical channels 12-1 to 12-9, as is discussed in FIG. 1*b*, the image sensor regions 14-1 to 14-9 of a line of the visual field of FIG. 1*b*, that is the image sensor regions 14-1 to 14-3, 14-4 to 14-6 and 14-7 to 14-9, each comprise an equal Y-component of the distance of the center points of the respective image sensor regions 14-1 to 14-3, 14-4 to 14-6 and 14-7 to 14-9 to the line 18. In other words, the Y-component of a row of the visual field of FIG. 1*b* and, thus, the angle of the visual field, that is the orientation of the respective optical channel in the object field, are equal.

A neighboring arrangement of optical channels 12-1 to 12-3, 12-4 to 12-6 and 12-7 to 12-9 neighboring in the visual field or object field may exemplarily, when wiring the optical channels 12-1 to 12-9 or the image sensor regions 14-1 to 14-9 of the image sensor, result in a simplified circuit layout. In other words, neighboring optical channels 12-1 to 12-9 of the row may exhibit an equal viewing angle in the Y-direction.

FIG. 4*b* shows a schematic top view of a portion 24' as a part of a multi-aperture device 20' with sorting of optical channels 12-1 to 12-9 in analogy to FIG. 4*a*, wherein the optical channels are arranged in the Y-direction such that the center points of the image sensor regions 14-1 to 14-9 are located on the line 18 and a substrate onto which the image sensor regions 14-1 to 14-9 are arranged may exhibit a reduced or minimized area consumption compared to FIGS. 2*a* and 4*a*. In other words, FIG. 4*b* shows a uniform setup or sorting order of the optical channels 12-1 to 12-9, that is the Y-components of the angle of the visual field of neighboring optical channels 12-1 to 12-9 are equal. Additionally, the pixel matrices in a row may be arranged such that the result is the smallest possible area consumption of the image sensor substrate. The optical channels 12-1 to 12-9 are shifted in the Y-direction compared to FIG. 1*a* such that the center points of the sub-imagers, that is the image sensor regions 14-1 to 14-9, are located on the line 18 and the envelope of the sub-imagers consequently exhibits a minimum extension in the Y-direction.

FIG. 5*a* shows a schematic top view of a section of a multi-aperture device 30 in the form of a portion 26 with an alternative sorting order of the optical channels 12-1 to 12-9. The optical channels 12-1 to 12-9 are arranged such that the image sensor regions 14-1 to 14-9, considered globally, exhibit maximum distances D93, D63, D86, D82, D52, D75, D71 and D41 to one another, that is a dead zone between the optical channels 12-1 to 12-9 is increased or maximized. This means that spaces between the image sensor regions 14-1 to 14-9 are distributed such that this allows optimum space utilization between the image sensor regions 14-1 to 14-9 such that crosstalk structures between the image sensor regions 14-1 to 14-9 may exhibit a maximum width, that is maximum extension along the line 18. Embodiments show crosstalk structures which each comprise an equal width between two image sensor regions 14-1 to 14-9 such that a maximum possible equal width may exemplarily be influenced by a minimum distance between two image sensor regions 14-1 to 14-9. As is, for example, shown in FIG. 2*a* in the image sensor regions 14-4 and 14-6, other criteria of optimization, like a maximum angular distance, may result in a reduced or minimum distance between two image sensor regions 14-1 to 14-9, up to a distance of nearly zero.

Other embodiments, as are discussed, for example, in FIG. 4*a*, comprise minimum distances between the image sensor regions 14-1 to 14-9, like 14-1 and 14-2 in FIG. 4*a*, which exemplarily correspond to only a fourth of a dimension of the optical channels 12-1 to 12-9 along the line 18 in the X-direction.

The distances D93, D63, D86, D82, D52, D75, D71 and D41, however, may comprise a large width compared to the dimension of the optical channels 12-1 to 12-9 in the X-direction and may be several hundred micrometers, like more than 200 µm, more than 400 µm or more than 700 µm, up to some millimeters, like more than 2 mm, more than 5 mm or more than 7 mm. A crosstalk structure may, for example, include a light-absorbing, partially transparent or opaque material and may be configured to reduce or prevent crosstalk, that is transition of light or electromagnetic radiation from one optical channel 12-1 to 12-9 to another optical channel 12-1 to 12-9. A maximum width of the crosstalk structures may result in maximum suppression of spurious light crosstalk between the optical channels 12-1 to 12-9. A globally maximized distance between the image sensor regions 14-1 to 14-9 may result in a uniform distribution of the clearances/spaces between the image sensor regions over the substrate surface. These uniform distances may be of advantage, for example, when integrating the non-light-sensitive electronical components in the clearances, since a uniform space may be available for each optical channel.

In other words, the sub-imagers of neighboring channels of the row comprise a maximum lateral distance in the image plane.

FIG. 5b shows a schematic top view of a portion 26' as a part of a multi-aperture device 30' with optical channels 12-1 to 12-9 in the sorting order in accordance with FIG. 5a, in which the center points of the image sensor regions 14-1 to 14-9 are arranged along the line 18.

In other words, FIG. 5b shows the sorting order of FIG. 5a in which the optical channels 12-1 to 12-9 are shifted in the Y-direction such that the center points of the sub-imagers are located on a line 18 and the envelope of the sub-imagers consequently comprises a minimum extension in the Y-direction.

FIGS. 6a-f show a schematic top view of optical multi-aperture devices with a super-resolution factor of 2 in both the X- and Y-directions, that is a number of four optical rows arranged next to one another. In other words, FIGS. 6a-f show overall views of the multi-aperture devices 10, 10', 20 20', 30 and 30' discussed above and illustrated in sections.

FIG. 6a shows a schematic top view of the multi-aperture device 10 with four portions 16a-d arranged next to one another along a row structure. The multi-aperture device 10 may also be referred to as variation A. Optical channels of the four portions 16a-d, which are oriented in roughly the same viewing direction, may additionally comprise a shift between the respective optics and the respective sub-image region by a fraction of, like half, a pixel pitch in the X- and/or Y-directions.

FIG. 6b shows a schematic top view of the multi-aperture device 10' with four portions 16'a-d arranged next to one another along a row structure. The multi-aperture device 10' may also be referred to as variation B.

FIG. 6c shows a schematic top view of the multi-aperture device 20 with four portions 24a-d arranged next to one another along a row structure. The multi-aperture device 20 may also be referred as variation C. Optical channels of the four portions 16a-d, which are oriented in roughly the same viewing direction, may additionally comprise a shift between the respective optics and the respective sub-image region by a fraction of, like half, a pixel pitch, in the X- and/or Y-directions.

FIG. 6d shows a schematic top view of the multi-aperture device 20' with four portions 24'a-d arranged next to one another along a row structure. The multi-aperture device 20' may also be referred to as variation D.

Figure 6E:
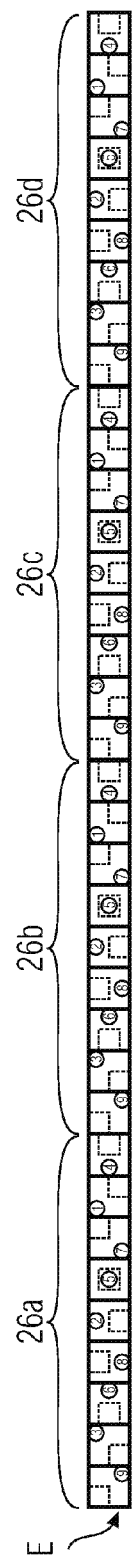
FIG. 6e is a schematic top view of the multi-aperture device with four portions in accordance with FIG. 5a arranged next to one another along a row structure, wherein the four portions differ in that the channels oriented in roughly the same viewing direction additionally comprise a shift between the respective optics and the respective sub-image region by half a pixel pitch in the X- and/or Y-directions.

FIG. 6e shows a schematic top view of the multi-aperture device 30 with four portions 26a-d arranged next to one another along a row structure. The multi-aperture device 30 may also be referred to as variation E. Optical channels of the four portions 16a-d which are oriented in roughly the same viewing direction may additionally comprise a shift between the respective optics and the respective sub-image region by a fraction of, like half, a pixel pitch, in the X- and/or Y-directions.

Figure 6F:
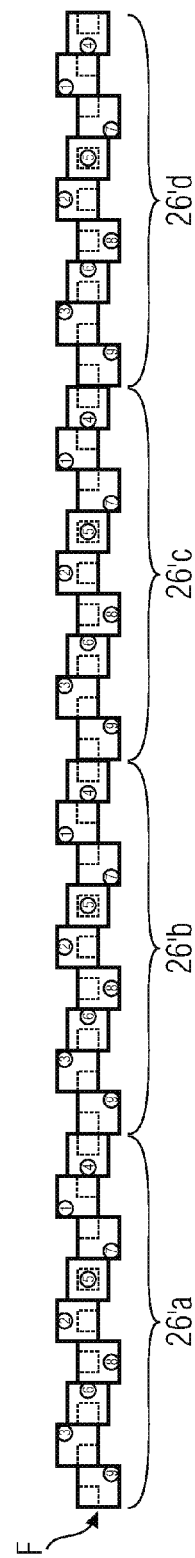
FIG. 6f is a schematic top view of the multi-aperture device with four portions in accordance with FIG. 5b arranged next to one another along a row structure.

FIG. 6f shows a schematic top view of the multi-aperture device 30' with four portions 26'a-d arranged next to one another along a row structure. The multi-aperture device 30' may also be referred to as variation F.

In contrast to FIGS. 2, 4 and 5, FIGS. 6a-f show a complete view of the rows of the respective optical devices 10, 10', 20, 20', 30, 30' for a super-resolution factor of 2 in both the X- and Y-directions, which correspondingly may allow $2^2=4$ nearly identical elements.

FIG. 7 shows four schematic views of alternative arrangements of the portions 16a-d of the variation A of FIG. 6a. A modified variation A', A'', A''' or A'''' each includes two portions or sub-regions A'-1 and A'-2. The sub-regions A'-1 and A'-2 each include two portions 16a and 16b and 16c and 16d as are illustrated in FIG. 1a. In variation A', the two sub-regions A'-1 and A'-2 are arranged perpendicularly and spaced apart from each other. In variation A'', the two sub-regions A'-1 and A'-2 are arranged perpendicularly and directly neighboring to each other such that the portion 16c and, thus, the sub-region A'-2 are arranged in an X-direction at the sub-region A'-1.

In variation A''', the sub-regions A'-1 and A'-2 are arranged directly neighboring to each other such that a distance between the portions 16b and 16c is minimum and an extension of variation A''' is equal in an X-direction and Y-direction.

Variation A'''' shows an arrangement of the two sub-regions A'-1 and A'-2 in analogy to variation A'', wherein the sub-region A'-2 is arranged to be neighboring to the sub-region A'-1 in a Y-direction.

Optical channels of the four portions 16a-d, which are oriented in approximately the same viewing direction, may each additionally exhibit a shift between the respective optics and the respective sub-image region by a fraction of, like half, a pixel pitch in the X- and/or Y-directions.

In other words, FIG. 7 shows a complete view of the arrangement with re-sorting of the imaging channels of FIG. 2 in two sub-rows arranged perpendicularly to each other, as may result for a super-resolution factor of 2 in both the X- and Y-direction, that is four imaging channels per viewing direction. The arrangement consists of two sub-regions, that is portions, of again two nearly identical sub-regions arranged one above the other, wherein the sub-imagers of equal viewing direction, that is equal numbering, in the four sub-regions of the row in X/Y are shifted by the width of a pixel divided by the respective super-resolution factor in the X- and Y-directions. The four variations A' to A'''' each exhibit an arrangement differing relative to the arrangement of two mutually perpendicular half-rows.

In principle, an overall row may include any number of portions, as is indicated in FIGS. 6a to 6f. Such an overall row may be subdivided into sub-rows which may be of mutually identical setups. The sub-rows may be arranged in any angle, like 45°, 60°, 90° or 180°, to one another.

Figure 8A:
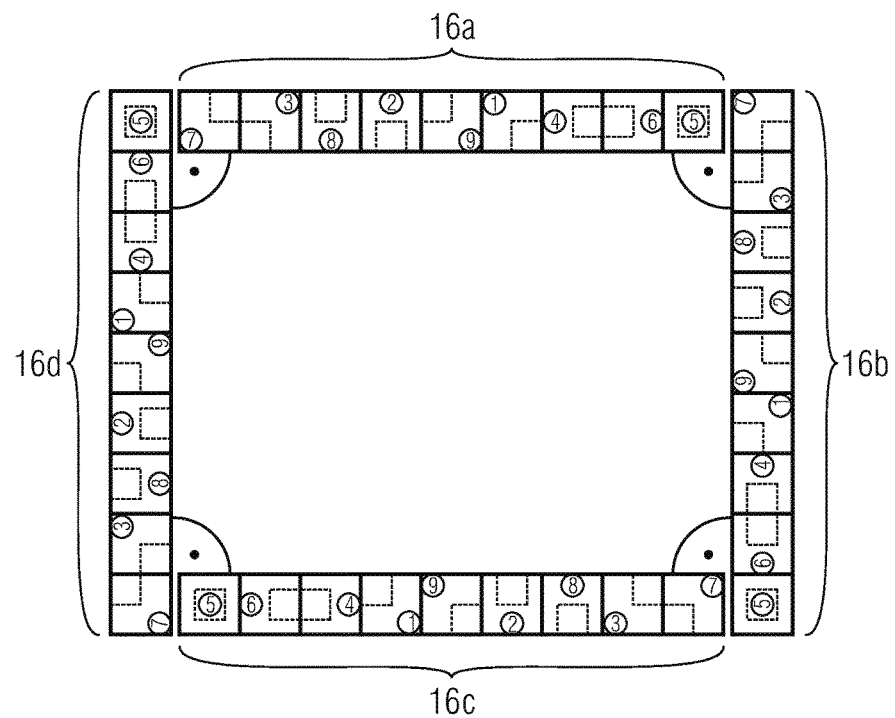
FIG. 8a is a schematic view of an arrangement of the imaging channels in accordance with a sorting order, as is illustrated in FIG. 1a, wherein the four portions differ in that the channels oriented in roughly the same viewing direction additionally exhibit a shift between the respective optics and the respective sub-image region by half a pixel pitch in the X- and/or Y-directions.

FIG. 8a shows a schematic view of an arrangement of the imaging channels in accordance with a sorting order, as is illustrated in FIG. 1a. Based on a super-resolution factor of 2, the device may comprise a number of four portions 16a-d which are exemplarily arranged to be directly neighboring to one another at right angles.

Figure 8B:
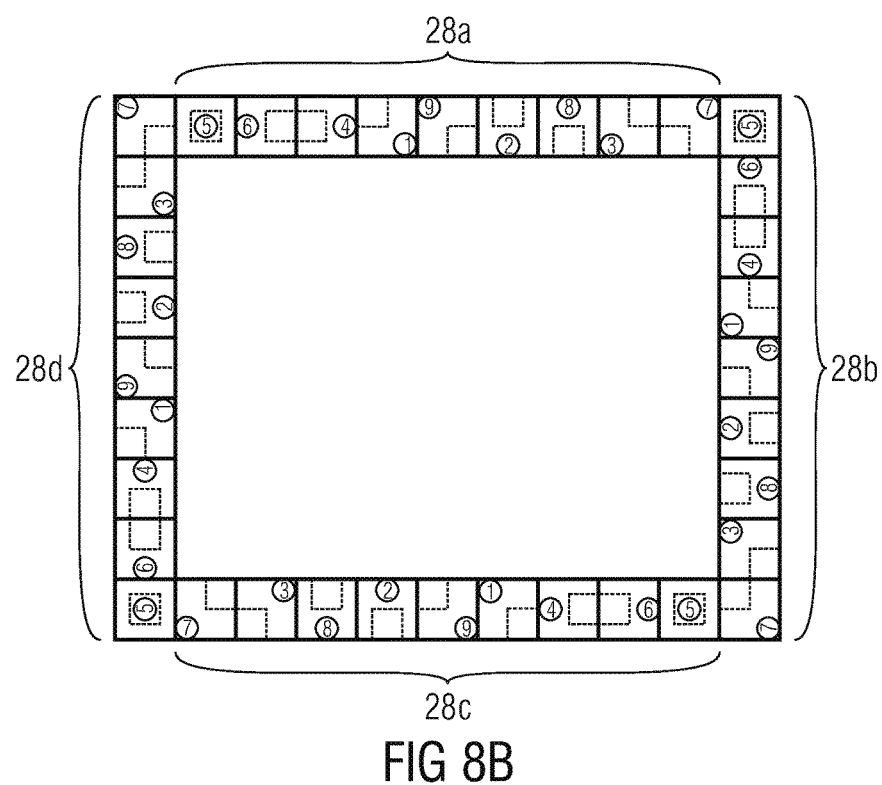
FIG. 8b shows an arrangement of four portions with an alternative sorting order of the optical channels.

FIG. 8b shows an arrangement of four portions 28a-d. A sorting order of the optical channels of a portion 28a-d may correspond to a mirrored sorting order of the portion 16. It is of advantage with this embodiment that the sorting order, while keeping the desired sorting effect, like a maximum angular distance between the individual image sensor regions, may be adjusted, for example due to an optimized positioning of the non-light-sensitive components or wiring of the substrate or a board configured to contact the respective image region sensors.

Figure 8C:
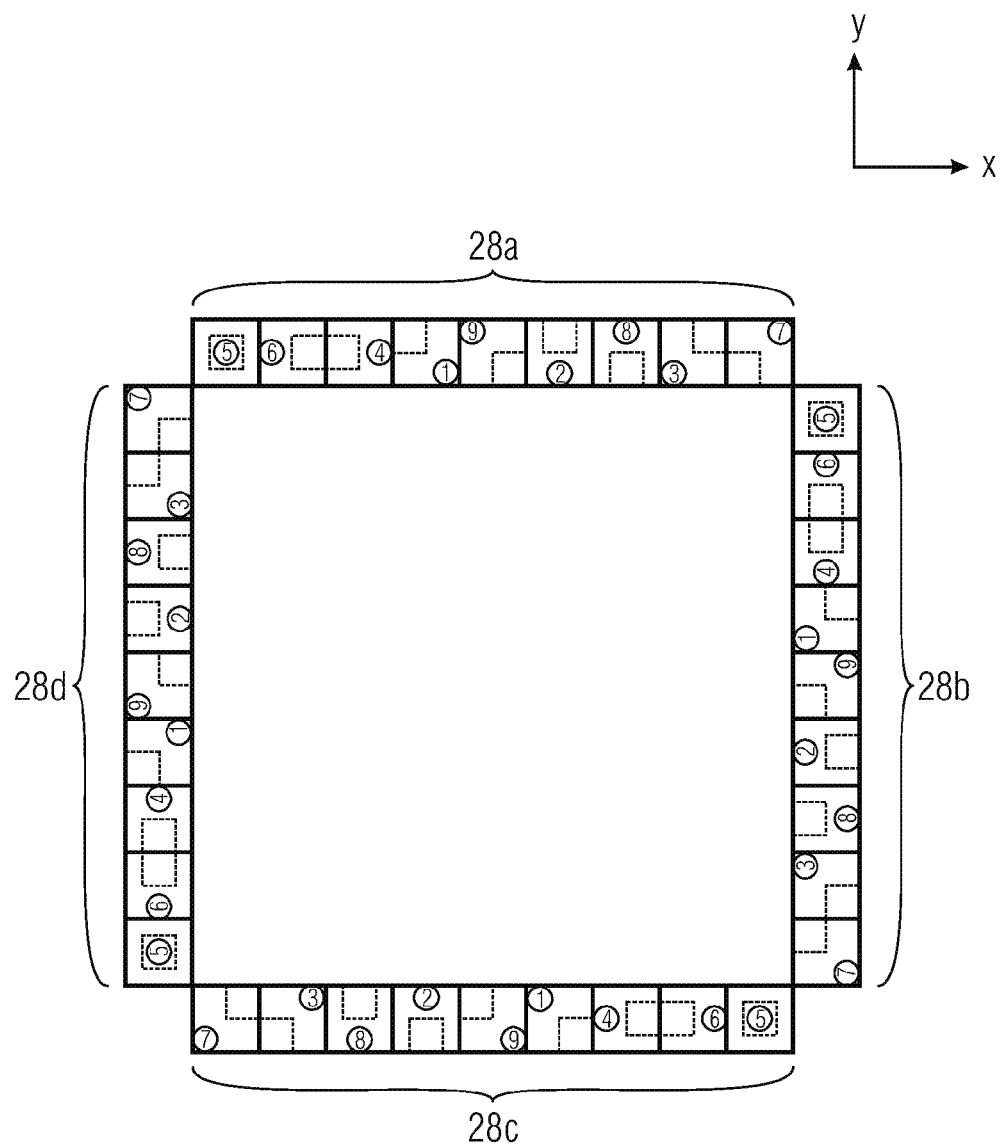
FIG. 8c is a schematic top view of a multi-aperture device, as is illustrated in FIG. 8b, wherein the portions are arranged such that an overlapping of edges in an X- and Y-direction between the individual portions is prevented.

FIG. 8c shows a schematic top view of a multi-aperture device, as is illustrated in FIG. 8b, in which the portions 16a-d are arranged such that overlapping of edges in an X- and Y-direction between the individual portions 28a-d is prevented, as is, for example, described in FIG. 7 for variation A'''. Such an arrangement allows a multi-aperture device with optical channels which may comprise dimensions of equal magnitude in the X- and Y-directions.

Figure 8D:
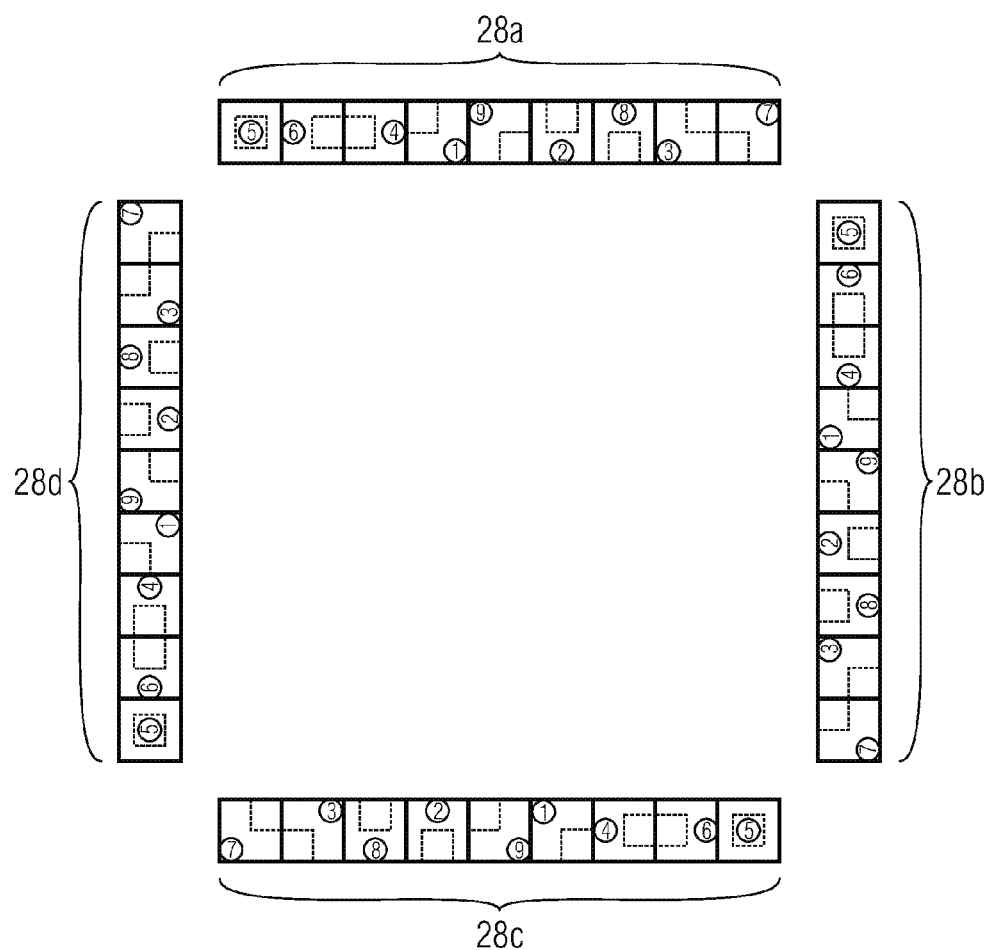
FIG. 8d shows a multi-aperture device in accordance with the implementation in FIG. 8c in which the portions are arranged spaced apart from one another, as is discussed for a variation in FIG. 7, for example.

FIG. 8d shows a multi-aperture device in accordance with the expositions in FIG. 8c, in which the portions 28a-d are arranged to be spaced apart from one another, as is, for example, discussed for variation A' in FIG. 7.

Optical channels of the four sections 16a-d or 28a-d which are oriented in approximately the same viewing direction may additionally exhibit a shift between the respective optics and the respective sub-image region by a fraction of, like half, a pixel pitch in the X- and/or Y-direction.

In other words, FIGS. 8a-d show re-sorting of the imaging channels of FIG. 7 in four mutually perpendicular rows, that is portions, for a super-resolution factor of 2 in both the X- and Y-directions, that is four imaging channels per viewing direction. FIGS. 8a-d each show a complete view of the exemplary arrangement. The respective arrangement consists of four approximately identical sub-regions arranged at right angles to one another, wherein the sub-imagers of equal viewing direction, that is image sensor regions of equal numbering, in the four sub-regions or sub-rows of the entire row in the X/Y-direction may be shifted by the width of a pixel divided by the respective super-resolution factor in the X- and Y-directions. FIG. 8a-d show four variations which differ in the arrangement of the four perpendicular sub-rows each.

The sub-rows may exhibit an angle different from 90° and/or a different number than four. Instead of a quadrangle, as is exemplarily shown in FIG. 8, a triangular structure, a pentagonal structure or a different polygon may, for example, be obtained. It is also conceivable for the row or sub-row to exhibit a curvature along the row orientation such that the optical channels exemplarily take the shape of an ellipse or a circle. When the sub-rows are, for example, passed in a clockwise or counterclockwise direction, an order of the optical channels like in accordance with FIGS. 6a-f may be obtained.

FIG. 9 shows a schematic view of an exemplary multi-channel imaging system in accordance with the known technology. The multi-channel imaging system consists of optical channels which are arranged in different viewing directions based on a super-resolution factor of 2 each in the X- and Y-directions. The object field, as is illustrated in FIG. 1b, may be detected four times by the device 50, that is each sub-region is detected four times. Optical channels comprising an equal or partly equal viewing direction, as is illustrated by identical numbering ① to ⑨ are arranged to be mutually neighboring, wherein imaging channels neighboring in the viewing direction are also arranged to be neighboring laterally. This means that exemplarily the optical channels with the viewing direction ① are arranged to be mutually neighboring. The different viewing directions are generated, among other things, by the lateral offset of the center points of the sub-image matrices, that is image sensor regions, as are indicated by the small broken-line areas. In order to achieve a decrease in the structural height of the imaging channels, the super-resolution method is applied. The device 50 comprises a super-resolution factor of N=2 each in the X- and Y-directions such that the optical channels of nearly equal image contents, that is of equal numbering ① to ⑨, and with nearly equal viewing direction in the X- and Y-directions, are shifted by the magnitude of a pixel width divided by the super-resolution factor, that is 2, wherein consequently four channels may be necessitated per viewing direction.

Figure 10:
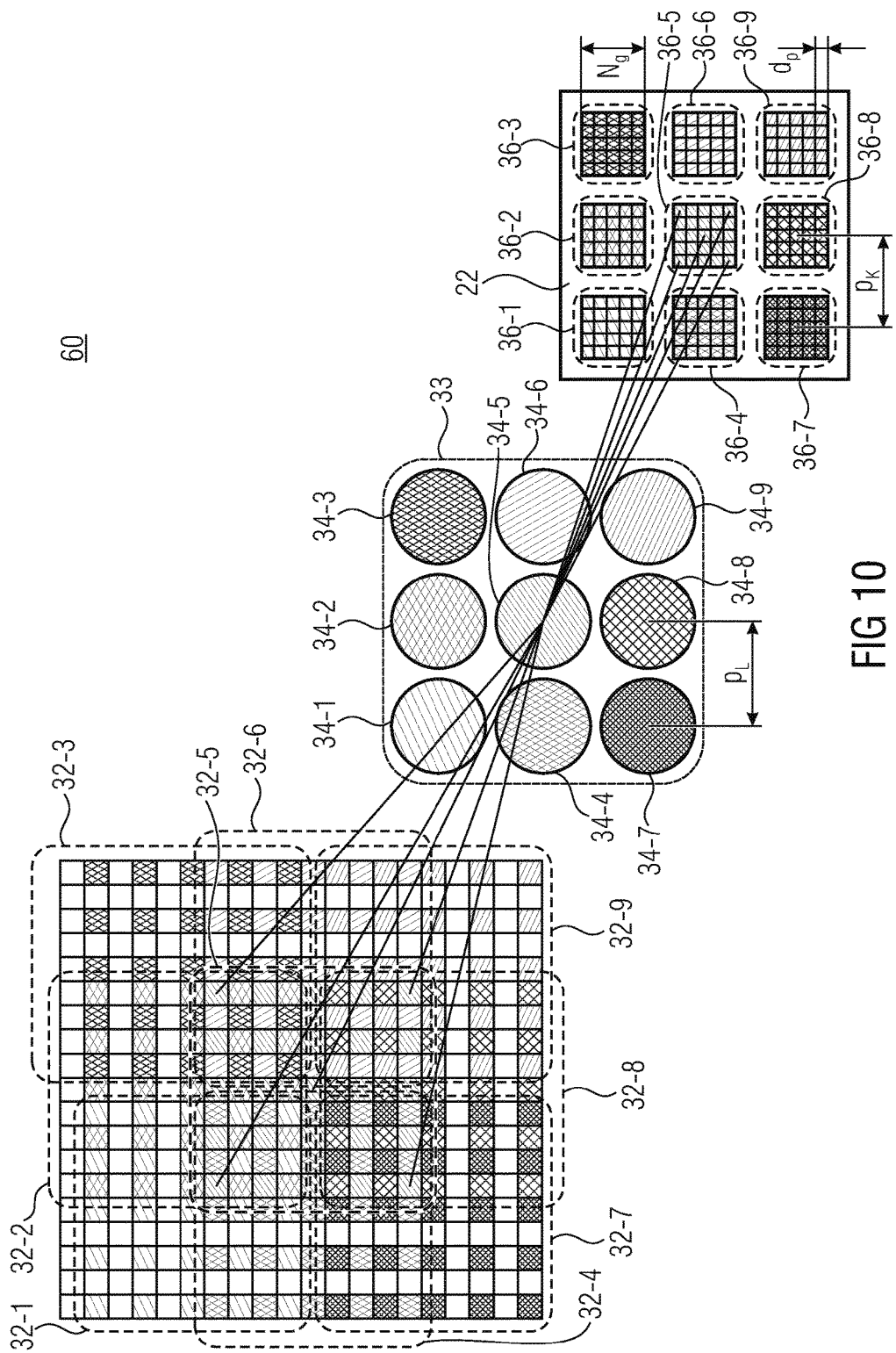
FIG. 10 is a schematic illustration of scanning different object sub-regions by a 2D cluster eye camera in accordance with the known technology.

FIG. 10 shows a schematic illustration of scanning different object sub-regions 32-1 to 32-9 by a known 2D cluster eye camera. Image points in the different object sub-regions 32-1 to 32-9 are each arranged to be neighboring in a cluster, as is indicated by different grayscales. In other words, the sub-regions 32-1 to 32-9 represent the object with an association of the object region to individual optical channels using the micro-lens array 33. The different object sub-regions 32-1 to 32-9 are mutually interlaced, as is indicated by the different grayscales of the points scanned. A micro-lens array 33 comprises segmentations 34-1 to 34-9, wherein the scanned regions 32-1 to 32-9 of the object plane are each associated to a segment 34-1 to 34-9. Neighboring center points of the segments 34-1 to 36-9 exhibit a distance of $p_L$ which may depend on a lateral extension of the sub-regions 32-1 to 32-9 and/or a distance $d_p$ of sub-region sensors on the substrate 22. The substrate 22 comprises regions 36-1 to 36-9 of the imager in order to produce sub-images. Each sub-region 36-1 to 36-9 comprises a number $N_g$ of sub-region sensors which may each be associated to a segment 32-1 to 32-9 of the object plane. Neighboring sub-regions 36-1 to 36-9 exhibit a lateral distance of the center points of $p_K$ which may be influenced by a lateral extension of the object region or an optical feature, like a focal length, of the segments 34-1 to 34-9 of the micro-lens array 33.

An optical channel may form between the object region and one of the $N_g$ sub-region sensors associated to a segment 34-1 to 34-9 of the micro-lens array 33. The object sub-regions 32-1 to 32-9 detected by neighboring optical channels each overlap by approximately half a size of the respective scan region, wherein the pixel grids of neighboring channels are offset by half the sub-image size and, additionally, by a fraction of the pixel distance, that is ½ dp, relative to one another. Thus, the surroundings of each object point may generally be detected by four optical channels each. An optical channel, as is described, for example, in DE 102009049387, may transmit any number, like 5×5 pixels. In other words, FIG. 10 shows 3×3 optical channels with 5×5 pixels each.

A linear arrangement in a row structure allows optical channels each to transmit, that is detect, only sub-regions of the entire object field and each object region, which is associated on the receiver side to the size of a pixel of an image converter, like an electro-optical image converter, to be detected by at least two optical channels.

Although some aspects have been described in connection with a device, it is to be understood that these aspects also represent a description of the corresponding method such that a block or element of a device is to be understood to be also a corresponding method step or feature of a method step. In analogy, aspects having been described in connection with or as a method step also represent a description of a corresponding block or detail or feature of a corresponding device.

Depending on certain implementation requirements, embodiments of the invention may be implemented in either hardware or software. The implementation may be done using a digital storage medium, for example a floppy disk, DVD, Blu-ray disc, CD, ROM, PROM, EPROM, EEPROM or FLASH memory, a hard disk drive or another magnetic or optical storage onto which are stored electronically readable control signals which can cooperate or cooperates with a programmable computer system such that the respective method will be executed. This means that the digital storage medium may be computer-readable. Some embodiments in accordance with the invention thus comprise a data carrier comprising electronically readable control signals which are able to cooperate with a programmable computer system such that one of the methods described herein will be performed.

Generally, embodiments of the present invention may be implemented as a computer program product having program code, the program code being operative to perform one of the methods when the computer product runs on a computer. The program code may, for example, be stored also on a machine-readable carrier.

Other embodiments include the computer program for performing one of the methods described herein, wherein the computer program is stored on a machine-readable carrier.

In other words, an embodiment of the inventive method is a computer program comprising program code for performing one of the methods described herein when the computer program runs on a computer. Another embodiment of the inventive method thus is a data carrier (or a digital storage medium or a computer-readable medium) onto which is recorded the computer program for performing one of the methods described herein.

Another embodiment of the inventive method thus is a data stream or a sequence of signals representing the computer program for performing one of the methods described herein. The data stream or the sequence of signals may, for example, be configured to be transferred via a data communications link, for example via the internet.

Another embodiment includes processing means, for example a computer or a programmable logic device configured or adapted to perform one of the methods described herein.

Another embodiment comprises a computer on which is installed the computer program for performing one of the methods described herein.

In some embodiments, a programmable logic device (for example a field-programmable gate array, FPGA) may be used to perform some or all functionalities of the methods described herein. In some embodiments, a field-programmable gate array may cooperate with a microprocessor so as to perform one of the methods described herein. Generally, in some embodiments, the methods are performed by any hardware device. This may be any universally usable hardware, like a computer processor (CPU), or hardware specific for the method, for example an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Kartik Venkataraman, Dan Lelescu, Jacques Duparré, Andre McMahon, Gabriel Molina, Prizam Chaterjee, Robert Mullis—Pelican Imaging Corporation; Shree Nayar—Columbia University: PiCam: An Ultra-Thin High Performance Monolithic Camera Array; http://www.pelicanimaging.com/technology/PiCam_sa13.pdf (6.11.2013)

The invention claimed is:

1. A multi-aperture device for detecting an object region, comprising:
at least two optical channels for detecting a first sub-region of the object region; and
at least two optical channels for detecting a second sub-region of the object region; wherein
the optical channels for detecting the first sub-region and the second sub-region are arranged in an interlaced manner in a one-row structure; and wherein
the first sub-region and the second sub-region overlap partly and are mutually different in the object region;
wherein each optical channel comprises an image sensor region the position of which on an image converter depends on a position of the sub-region to be detected within the object region, and wherein optical centers of optics of the optical channels are located on a line along individual optical channels and centers of the image sensor regions of the optical channels vary compared to an equidistant and collinear distribution relative to the line; or
wherein each optical channel comprises an image sensor region the position of which on an image converter depends on a position of the sub-region to be detected within the object region, and wherein centers of the image sensor regions of the optical channels are located on a line along individual optical channels and optical centers of optics of the optical channels vary compared to an equidistant and collinear distribution relative to the line.

2. The multi-aperture device in accordance with claim 1, wherein the at least two optical channels for detecting the first sub-region of the object region and the at least two optical channels for detecting the second sub-region of the object region comprise a mutually different angle of view and are configured to detect a mutually different sub-region of the object region.

3. The multi-aperture device in accordance with claim 1, wherein the multi-aperture device comprises a one-row setup such that the arrangement of the optical channels for detecting the first sub-region and the arrangement of the optical channels for detecting the second sub-region are one-row arrangements and may be described as a 1×N form.

4. The multi-aperture device in accordance with claim 1, wherein the at least two optical channels for detecting the first sub-region of the object region and the at least two optical channels for detecting the second sub-region of the object region each comprise pixel grids comprising a number of pixels.

5. The multi-aperture device in accordance with claim 1, wherein, in the optical channels for detecting the first sub-region, the center points of pixel arrays of image sensor regions of the respective optical channels are shifted relative to the center points of the respective imaging optics of the respective optical channel to one another laterally by the fraction of a pixel pitch such that the first sub-region is scanned by at least two of the optical channels in a way shifted laterally by a sub-pixel offset.

6. The multi-aperture device in accordance with claim 1, wherein a number of optical channels of the first the second sub-region is identical.

7. The multi-aperture device in accordance with claim 1, wherein at least one of the optical channels comprises an optical transmission filter such that a spectral color is associated to the at least one optical channel.

8. The multi-aperture device in accordance with claim 1, wherein the single-row structure comprises at least two essentially rectilinear portions which are arranged in angles to one another.

9. The multi-aperture device in accordance with claim 8, wherein the at least two portions comprise an identical number of optical channels.

10. The multi-aperture device in accordance with claim 8, wherein the at least two portions are arranged such that they follow one after the other.

11. The multi-aperture device in accordance with claim 1, comprising at least two optical channels for detecting a third sub-region of the optic region, wherein the third optical sub-region at least partly overlaps the first or second optical sub-region, wherein the optical channels are arranged to be interlaced such that optical channels for detecting one of the sub-regions on an image converter comprise a maximum distance relative to one another.

12. The multi-aperture device in accordance with claim 1, comprising at least two optical channels for detecting a third sub-region of the object region which at least partly overlaps the first or second sub-region, and wherein the optical channels are arranged on an image converter such that an arrangement of the optical channels on an image converter corresponds to an arrangement with a maximum angular distance of the sub-regions.

13. The multi-aperture device in accordance with claim 1, comprising at least two optical channels for detecting a third sub-region of the object region which at least partly overlaps the first or second sub-region, and wherein the optical channels are arranged on an image converter such that an arrangement of the optical channels on an image converter corresponds to a uniform arrangement relative to two lateral directions of the sub-regions.

14. The multi-aperture device in accordance with claim 1, comprising at least two optical channels for detecting a third sub-region of the object region which at least partly overlaps the first or second sub-region, and wherein the optical channels are arranged on an image converter such that an arrangement of the optical channels on an image converter corresponds to a maximum dead zone between the sub-regions.

15. A system comprising a multi-aperture device in accordance with claim 1.

16. The system in accordance with claim 15, wherein the system is a mobile phone.

17. A method for detecting an object region, comprising:
arranging at least two optical channels for detecting a first sub-region of the object region on an image converter; and
arranging at least two optical channels for detecting a second sub-region of the object region on the image converter; wherein
the optical channels for detecting the first and second sub-regions are arranged in an interlaced manner in a one-row structure; and wherein
the first and second sub-regions overlap partly and are mutually different in the object region;
wherein arranging the optical channels takes place such that each optical channel comprises an image sensor region the position of which on an image converter depends on a position of the sub-region to be detected within the object region, and such that optical centers of optics of the optical channels are located on a line along individual optical channels and centers of the image sensor regions of the optical channels vary compared to an equidistant and collinear distribution relative to the line; or
wherein arranging the optical channels takes place such that each optical channel comprises an image sensor region the position of which on an image converter depends on a position of the sub-region to be detected within the object region, and such that centers of the image sensor regions of the optical channels are located on a line along individual optical channels and optical centers of optics of the optical channels vary compared to an equidistant and collinear distribution relative to the line.

* * * * *